US012302274B2

United States Patent
Kumar

(10) Patent No.: US 12,302,274 B2
(45) Date of Patent: May 13, 2025

(54) METHOD AND UE FOR HANDLING COLLISION IN A WIRELESS COMMUNICATION NETWORK

(71) Applicant: Samsung Electronics Co., Ltd., Suwon-si (KR)

(72) Inventor: Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 17/607,857

(22) PCT Filed: Apr. 29, 2020

(86) PCT No.: PCT/KR2020/005805
§ 371 (c)(1),
(2) Date: Oct. 29, 2021

(87) PCT Pub. No.: WO2020/222579
PCT Pub. Date: Nov. 5, 2020

(65) Prior Publication Data
US 2022/0217670 A1   Jul. 7, 2022

(30) Foreign Application Priority Data

Apr. 30, 2019 (IN) .............................. 201941017137
Apr. 27, 2020 (IN) .............................. 201941017137

(51) Int. Cl.
*H04W 60/00* (2009.01)
*H04W 60/04* (2009.01)
(Continued)

(52) U.S. Cl.
CPC ........... *H04W 60/04* (2013.01); *H04W 60/06* (2013.01); *H04W 76/25* (2018.02); *H04W 84/042* (2013.01)

(58) Field of Classification Search
None
See application file for complete search history.

(56) References Cited

U.S. PATENT DOCUMENTS 10,687,300 B2    6/2020 Youn et al.
11,212,738 B2 *  12/2021 Kim .................. H04W 24/04
(Continued)

FOREIGN PATENT DOCUMENTS

CN    101583119 A    11/2009
CN    109479252 A    3/2019
(Continued)

OTHER PUBLICATIONS

Intellectual Property India, "Examination report under sections 12 & 13 of the Patents Act" dated Nov. 17, 2021, in connection with counterpart Indian Patent Application No. 201941017137, 6 pages.
(Continued)

*Primary Examiner* — Gerald A Smarth

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

Embodiments herein disclose a method for handling collision in a wireless communication network. The method includes detecting the collision between a registration procedure initiated by the UE (100) and a deregistration procedure initiated by the wireless communication network and determining whether the cause value received in the deregistration request message is one of a specific cause value for (Continued)

the deregistration procedure. Further, the method includes performing one of: aborting the deregistration procedure initiated by the wireless communication network and proceeding with the registration procedure initiated by the UE (100) on determining that the cause value is one of the specific cause value for the deregistration procedure; and aborting the registration procedure initiated by the UE (100) and proceeding with the deregistration procedure initiated by the wireless communication network on determining that the cause value is not one of the specific cause value for the deregistration procedure.

12 Claims, 18 Drawing Sheets

(51) Int. Cl.
*H04W 60/06* (2009.01)
*H04W 76/25* (2018.01)
*H04W 84/04* (2009.01)

(56) References Cited

U.S. PATENT DOCUMENTS

| | | | | |
|---|---|---|---|---|
| 11,375,471 | B2* | 6/2022 | Kim | H04W 76/18 |
| 2003/0134638 | A1 | 7/2003 | Sundar et al. | |
| 2011/0113157 | A1* | 5/2011 | Kim | H04W 76/12 |
| | | | | 709/248 |
| 2011/0145388 | A1 | 6/2011 | Hao et al. | |
| 2018/0332523 | A1* | 11/2018 | Faccin | H04W 8/12 |
| 2019/0174449 | A1* | 6/2019 | Shan | H04W 60/04 |
| 2019/0268827 | A1 | 8/2019 | Kim et al. | |
| 2019/0357129 | A1 | 11/2019 | Park et al. | |

FOREIGN PATENT DOCUMENTS

| | | | |
|---|---|---|---|
| WO | WO-2018016927 A1 * | 1/2018 | |
| WO | 2018/088756 A1 | 5/2018 | |
| WO | 2018/093168 A1 | 5/2018 | |
| WO | 2018/097599 A1 | 5/2018 | |

OTHER PUBLICATIONS

Intel, "Discussion on coordination between the state machines for GMM and 5GMM", 3GPP TSG CT WG1 Meeting #115, Feb. 25-Mar. 1, 2019, C1-192268, 9 pages.
Nokia et al., "New 5GMM cause values for CAG", Change Request, 3GPP TSG CT WG1 Meeting #116, Apr. 8-12, 2019, C1-192334, 27 pages.
3GPP TS 24.501 V16.0.2, "3GPP; TSG CT; Non-Access-Stratum (NAS) protocol for 5G System (5GS); Stage 3; (Release 16)", Mar. 29, 2019, 480 pages.
International Search Report dated Jul. 30, 2020 in connection with International Patent Application No. PCT/KR2020/005805, 3 pages.
Written Opinion of the International Searching Authority dated Jul. 30, 2020 in connection with International Patent Application No. PCT/KR2020/005805, 4 pages.
Notification of the First Office Action dated Nov. 14, 2023, in connection with Chinese Patent Application No. 202080032402.3, 16 pages.
3GPP TS 24.501 V15.3.0 (Mar. 2019), 5G; Non-Access-Stratum (NAS) protocol for 5G System (5GS); Mar. 2019; Stage 3; 485 pages.
Notification of the Second Office Action dated Jun. 26, 2024, in connection with Chinese Patent Application No. 202080032402.3, 15 pages.
Notification of Grant of Patent Right to Invention dated Feb. 20, 2025, in connection with Chinese Application No. 2020800324023, 8 pages.

* cited by examiner

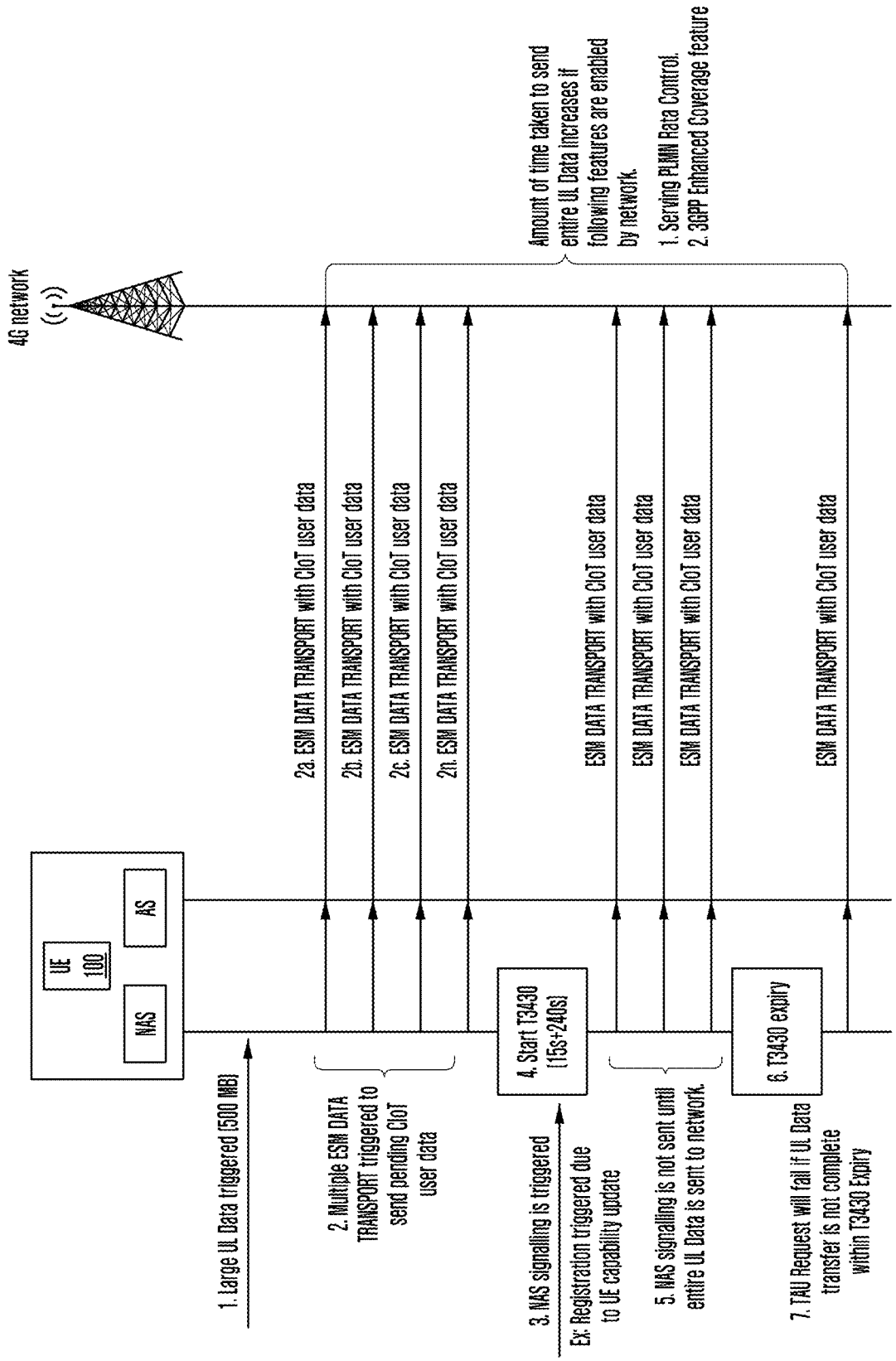

METHOD AND UE FOR HANDLING COLLISION IN A WIRELESS COMMUNICATION NETWORK

CROSS-REFERENCE TO RELATED APPLICATIONS

This application is a 371 of International Application No. PCT/KR2020/005805 filed on Apr. 29, 2020, which claims priority to India Patent Application No. 201941017137 filed on Apr. 30, 2019, and India Patent Application No. 201941017137 filed on Apr. 27, 2020, the disclosures of which are herein incorporated by reference in their entirety.

BACKGROUND

1. Field

The present disclosure relates to wireless communication, and more particularly to a method and user equipment for handling collision in a wireless communication network.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In general, Non-Access Stratum (NAS) layer is a functional layer for exchanging Signalling and traffic messages between a user equipment (UE) and a wireless communication network in an Evolved Packet System (EPS) and fifth generation system (5GS) protocol stack. The main function of the NAS layer is to support mobility of the UE and to support session management procedure. However, with the advancement and evolution of technicalities associated with the wireless communication networks, a plurality of issues with respect to NAS Signalling messages have been highlighted.

One such scenario associated with the NAS Signalling messages is where the UE is in INACTIVE state and moved to a Public Land Mobile Network (PLMN) ID 2 from a PLMN ID 1 due to mobility. However, the wireless communication network is unaware that the UE has moved to the PLMN ID 2 and sends a NAS message (DEREGISTRATION REQUEST message) to the UE with a cause such as for example #11 indicating to the UE to populate the currently camped PLMN in a forbidden PLMN list. The UE populates the PLMN ID 2 in the forbidden PLMN list while the wireless communication network wanted the UE to populate the PLMN ID 1 in the forbidden PLMN list (wireless communication network is not aware that the UE is camped to the PLMN ID2). Therefore, due to the miscommunication between the UE and the wireless communication network, the UE will not attempt to receive service on the PLMN ID 2 even if the PLMN ID 2 is the only PLMN servicing an area. As a result, the UE suffers due to being under-serviced or no-service even though the PLMN ID 2 is available in the area.

In another scenario, Cellular Internet of Things (CIoT) uplink user data is transmitted over a control plane when control plane optimization is enabled. However, when the CIoT user data is very large then the UE (100) takes a long time to complete the CIoT UL user data transmission. Since the NAS Signalling message transmission and the CIoT UL user data is transmitted through the same NAS Signalling connection, the transmission of the NAS Signalling message at a time when the CIoT UL user data transmission is on-going is queued. As a result of the transmission of the large amount of the CIoT UL user data, the NAS Signalling message transfer is significantly delayed. When the NAS Signalling message is for example a registration request then the delay will lead to a registration failure of the UE, which needs to be addressed.

Thus, it is desired to address the above mentioned disadvantages or other shortcomings or at least provide a useful alternative.

SUMMARY

Accordingly the embodiments herein disclose a method for handling a collision between a registration procedure initiated by a user equipment (UE) (100) and a deregistration procedure initiated by a wireless communication network. The method includes initiating, by the UE (100), the registration procedure for example a mobility and periodic registration update by sending a registration request message to the wireless communication network and receiving, by the UE (100), a deregistration request message from the wireless communication network for performing the deregistration procedure before completion of the registration procedure for the mobility and periodic registration update initiated by the UE (100). The deregistration request message comprises a cause value for deregistration procedure. Further, the method includes detecting, by the UE (100), the collision between the registration procedure initiated by the UE (100) and the deregistration procedure initiated by the wireless communication network and determining, by the UE (100), whether the cause value received in the deregistration request message is one of a specific cause value for the deregistration procedure. Furthermore, the method includes handling, by the UE (100), the collision between the registration procedure initiated by the UE (100) and the deregistration procedure initiated by the wireless communication network by performing one of: aborting the deregistration procedure initiated by the wireless communication network and proceeding with the registration procedure initiated by the UE (100), in response to determining that the cause value received in the deregistration request message is one of the specific cause value for the deregistration procedure; and aborting the registration procedure initiated by the UE (100) and proceeding with the deregistration procedure initiated by the wireless communication network, in response to determining that the cause value received in the deregistration request message is not one of the specific cause value for the deregistration procedure.

In an embodiment, the specific cause value for the deregistration procedure is one of #11, #12, #13 and #15.

In an embodiment, detecting, by the UE (100), the collision between the registration procedure initiated by the UE (100) and the deregistration procedure initiated by the wireless communication network includes determining, by the UE (100), that the deregistration request message from the wireless communication network is received before receiving a registration accept message from the wireless communication network. The registration accept message indicates a response of the registration procedure for the mobility and periodic registration update initiated by the UE (100). Further, the method includes detecting, by the UE (100), the collision between the registration procedure initiated by the UE (100) and the deregistration procedure initiated by the wireless communication network.

In an embodiment, detecting, by the wireless communication network, the collision between the registration procedure initiated by the UE (100) and the deregistration procedure initiated by the wireless communication network includes determining, by the wireless communication network, that the registration request message is received from the UE (100) before receiving a deregistration accept message from the UE (100). The deregistration accept indicates a response of the deregistration procedure initiated by the wireless communication network.

Accordingly the embodiments herein disclose a method for handling a collision between a registration procedure initiated by a user equipment (UE) (100) and a deregistration procedure initiated by a wireless communication network. The method includes initiating, by the wireless communication network, the deregistration procedure by sending a deregistration request message to the UE (100) and receiving, by the wireless communication network, a registration request message from the UE (100) for performing the registration procedure for a mobility and periodic registration update. The deregistration request message comprises a cause value for deregistration procedure. Further, the method includes detecting, by the wireless communication network, the collision between the registration procedure initiated by the UE (100) and the deregistration procedure initiated by the wireless communication network and determining, by the wireless communication network, whether the cause value received in the deregistration request message is one of a specific cause value for the deregistration procedure. Furthermore, the method includes handling, by the wireless communication network, the collision between the registration procedure initiated by the UE (100) and the deregistration procedure initiated by the wireless communication network by performing one of: aborting the deregistration procedure initiated by the wireless communication network and proceeding with the registration procedure initiated by the UE (100), in response to determining that the cause value received in the deregistration request message is one of the specific cause value for the deregistration procedure, and aborting the registration procedure initiated by the UE (100) and proceeding with the deregistration procedure initiated by the wireless communication network, in response to determining that the cause value received in the deregistration request message is not one of the specific cause value for the deregistration procedure.

Accordingly the embodiments herein disclose a user equipment (UE) (100) for handling a collision between a registration procedure initiated by the UE (100) and a deregistration procedure initiated by a wireless communication network. The UE (100) includes a memory (140) and a processor (160) coupled to the memory (140). The processor (160) is configured to initiate the registration procedure for mobility and periodic registration update by sending a registration request message to the wireless communication network and receive a deregistration request message from the wireless communication network for performing the deregistration procedure before completion of the registration procedure for the mobility and periodic registration update initiated by the UE (100). The deregistration request message comprises a cause value for deregistration procedure. Further, the processor (160) is configured to detect the collision between the registration procedure initiated by the UE (100) and the deregistration procedure initiated by the wireless communication network and determine whether the cause value received in the deregistration request message is one of a specific cause value for the deregistration procedure. Furthermore, the processor (160) is configured to handle the collision between the registration procedure initiated by the UE (100) and the deregistration procedure initiated by the wireless communication network by performing one of: abort the deregistration procedure initiated by the wireless communication network and proceeding with the registration procedure initiated by the UE (100), in response to determining that the cause value received in the deregistration request message is one of the specific cause value for the deregistration procedure, and abort the registration procedure initiated by the UE (100) and proceeding with the deregistration procedure initiated by the wireless communication network, in response to determining that the cause value received in the deregistration request message is not one of the specific cause value for the deregistration procedure.

Accordingly the embodiments herein disclose an access and mobility management function (AMF) (1000) of a wireless communication network for handling a collision between a registration procedure initiated by the UE (100) and a deregistration procedure initiated by the wireless communication network. The AMF (1000) includes a memory (1400) and a processor (1600) coupled to the memory (1400). The processor (1600) is configured to initiate the deregistration procedure by sending a deregistration request message to the UE (100) and receive a registration request message from the UE (100) for performing the registration procedure for mobility and periodic registration update. The deregistration request message comprises a cause value for deregistration procedure. Further, the processor (1600) is also configured to detect the collision between the registration procedure initiated by the UE (100) and the deregistration procedure initiated by the wireless communication network and determine whether the cause value received in the deregistration request message is one of a specific cause value for the deregistration procedure. Furthermore, the processor (1600) is configured to handle the collision between the registration procedure initiated by the UE (100) and the deregistration procedure initiated by the wireless communication network by performing one of: abort the deregistration procedure initiated by the wireless communication network and proceeding with the registration procedure initiated by the UE (100), in response to determining that the cause value received in the deregistration request message is one of the specific cause value for the deregistration procedure, and abort the registration procedure initiated by the UE (100) and proceeding with the deregistration procedure initiated by the wireless communication network, in response to determining that the cause value received in the deregistration request message is not one of the specific cause value for the deregistration procedure.

Accordingly the embodiments herein disclose a method for managing Non-Access Stratum (NAS) Signalling by a user equipment (UE) (100) in a wireless communication network. The method includes generating, by the UE (100), a first queue and a second queue and determining, by the UE (100), an initiation of NAS message for transmission of control plane user data to the wireless communication network in a connected mode. The second queue comprises pending control plane user data. Further, the method includes determining, by the UE (100), whether the first queue comprises at least one NAS Signalling message pending at the UE (100). Furthermore, the method includes performing, by the UE (100), one of: transmitting the at least one NAS Signalling message pending at the UE (100) from the first queue, and transmitting the control plane user data from the second queue to the wireless communication network after the transmission of the at least one NAS Signalling message pending at the UE (100), in response to determining that the first queue comprises the at least one NAS Signalling message pending at the UE (100), and transmitting the control plane user data from the second queue to the wireless communication network, in response to determining that the first queue does not comprise the at least one NAS Signalling message pending at the UE (100).

Accordingly the embodiments herein disclose a user equipment (UE) (100) for managing Non-Access Stratum (NAS) Signalling in a wireless communication network. The UE (100) includes a memory (140) and a processor (160) coupled to the memory (140). Further, the processor (160) is configured to generate a first queue and a second queue and determine an initiation of NAS message for transmission of control plane user data to the wireless communication network in a connected mode. The second queue comprises pending control plane user data. Further, the processor (160) is also configured to determine whether the first queue comprises at least one NAS Signalling message pending at the UE (100). Furthermore, the processor (160) is also configured to perform one of: transmit the at least one NAS Signalling message pending at the UE (100) from the first queue, and transmitting the control plane user data from the second queue to the wireless communication network after the transmission of the at least one NAS Signalling message pending at the UE (100), in response to determining that the first queue comprises the at least one NAS Signalling message pending at the UE (100), and transmit the control plane user data from the second queue to the wireless communication network, in response to determining that the first queue does not comprise the at least one NAS Signalling message pending at the UE (100).

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Embodiments herein are to provide a method and user equipment (UE) for handling collision in a wireless communication network.

BRIEF DESCRIPTION OF THE DRAWINGS

This invention is illustrated in the accompanying drawings, throughout which like reference letters indicate corresponding parts in the various figures. The embodiments herein will be better understood from the following description with reference to the drawings, in which:

FIG. 6Bb is a Signalling diagrams illustrating the prioritization of the NAS Signalling message over the CIoT user data by the UE (100) in the 5G communication network, according to the embodiments as disclosed herein;

FIG. 7A is a Signalling diagram illustrating the failure in the transmission of the NAS Signalling message due to a large amount of CIoT user data being transmitted by the UE (100) in the 4G communication network, according to the prior art;

FIG. 7Bb is a Signalling diagram illustrating the prioritization of the NAS Signalling message over the CIoT user data by the UE (100) in the 4G communication network, according to the embodiments as disclosed herein.

DETAILED DESCRIPTION

Figure 1A:
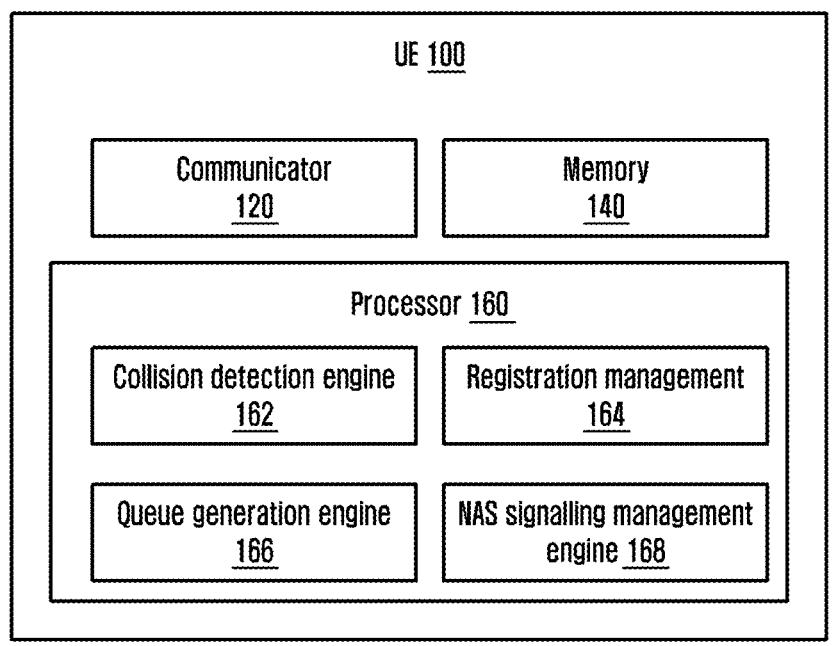
FIG. 1A is a block diagram of user equipment (UE) (100) for handling a collision between a registration procedure initiated by the UE (100) and a deregistration procedure initiated by a wireless communication network, according to the embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog or digital circuits such as logic gates, integrated circuits, microprocessors, microcontrollers, memory circuits, passive electronic components, active electronic components, optical components, hard-wired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly the embodiments herein disclose a method for handling a collision between a registration procedure initiated by a user equipment (UE) (100) and a deregistration procedure initiated by a wireless communication network. The method includes initiating, by the UE (100), the registration procedure for mobility and periodic registration update by sending a registration request message to the wireless communication network and receiving, by the UE (100), a deregistration request message from the wireless communication network for performing the deregistration procedure before completion of the registration procedure for the mobility and periodic registration update initiated by the UE (100). Further, the method includes detecting, by the UE (100), the collision between the registration procedure initiated by the UE (100) and the deregistration procedure initiated by the wireless communication network and determining, by the UE (100), whether the deregistration request message comprises a cause for the deregistration procedure.

Furthermore, the method includes handling, by the UE (100), the collision between the registration procedure initiated by the UE (100) and the deregistration procedure initiated by the wireless communication network by performing one of: aborting the deregistration procedure initiated by the wireless communication network and proceeding with the registration procedure initiated by the UE (100), in response to determining that the deregistration request message comprises the cause for the deregistration procedure; and aborting the registration procedure initiated by the UE (100) and proceeding with the deregistration procedure initiated by the wireless communication network, in response to determining that the deregistration request message does not comprise the cause for the deregistration procedure.

Referring now to the drawings and more particularly to FIGS. 1 through 7B, where similar reference characters denote corresponding features consistently throughout the figure, these are shown preferred embodiments.

FIG. 1A is a block diagram of user equipment (UE) (100) for handling a collision between a registration procedure initiated by the UE (100) and a deregistration procedure initiated by a wireless communication network, according to the embodiments as disclosed herein.

Referring to the FIG. 1, the UE (100) can be, for example, a mobile phone, a smart phone, Personal Digital Assistant (PDA), a tablet, a wearable device, or the like. In an embodiment, the UE (100) includes a communicator (120), a memory (140) and a processor (160).

In an embodiment, the communicator (120) is configured to send a registration request message to the wireless communication network and receive a deregistration request message from the wireless communication network for performing the deregistration procedure before completion of the registration procedure for the mobility and periodic registration update initiated by the UE (100).

The registration procedure for the mobility and periodic registration update initiated by the UE (100) is an example of the registration procedure initiated by the UE (100). Further, the registration procedure triggered by the UE can be for any of the purpose. Also the registration procedure is analogous to tracking area update (TAU) procedure.

The memory (140) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (140) may, in some examples, be considered a non-transitory storage medium. The term "non-transitory" may indicate that the storage medium is not embodied in a carrier wave or a propagated signal. However, the term "non-transitory" should not be interpreted that the memory (140) is non-movable. In some examples, the memory (140) is configured to store larger amounts of information than the memory. In certain examples, a non-transitory storage medium may store data that can, over time, change (e.g., in Random Access Memory (RAM) or cache).

The processor (160) includes collision detection engine (162), a registration management engine (164), a Queue generation engine (166) and a Non-Access Stratum (NAS) Signalling management engine (168).

In an embodiment, the collision detection engine (162) is configured to detect the collision between the registration procedure initiated by the UE (100) and the deregistration procedure initiated by the wireless communication network. This includes determining, by the UE (100), that the deregistration request message from the wireless communication network is received before receiving a registration accept message from the wireless communication network. The registration accept message indicates a response of the registration procedure initiated by the UE (100). Further, the method includes detecting, by the UE (100), the collision between the registration procedure initiated by the UE (100) and the deregistration procedure initiated by the wireless communication network.

The registration procedure is initiated by the UE (100) can be due to the mobility of the UE (100). The deregistration procedure is initiated by the wireless communication network can be due to expiry of the agreement with the first PLMN. Further, the collision detection engine (162) is configured to determine whether the deregistration request message comprises a specific cause value for the deregistration procedure. The specific cause value for the deregistration procedure is one of #11, #12, #13 and #15. The wrong forbidden TAI or PLMN will be populated in the corresponding forbidden list when the cause for the deregistration procedure is one of #11, #12, #13 and #15. The proposed method discussed for the PLMNs is also applicable for TAI. The proposed method can be applied in case of the collision between network initiated deregistration procedure with cause #11, #12, #13 or #15 and the UE (100) in state 5GMM-REGISTERED initiating the registration procedure for mobility and periodic registration update by sending a REGISTRATION REQUEST message to the AMF (1000) when the UE (100) in 5GMM-CONNECTED mode with RRC inactive indication enters a new cell (or optionally shared network cell) in the current registration area belonging to an equivalent PLMN of the registered PLMN and not belonging to the registered PLMN.

In an embodiment, the registration management engine (164) is configured to handle the collision between the registration procedure initiated by the UE (100) and the deregistration procedure initiated by the wireless communication network by performing one of: aborting the deregistration procedure initiated by the wireless communication network and proceeding with the registration procedure initiated by the UE (100), in response to determining that the cause value received in the deregistration request message is one of the specific cause value for the deregistration procedure; and aborting the registration procedure initiated by the UE (100) and proceeding with the deregistration procedure initiated by the wireless communication network, in response to determining that the cause value received in the deregistration request message is not one of the specific cause value for the deregistration procedure.

The proposed method refers to specific cause values #11, #12, #13, #15 which may not be limited to the same. The cause value #11 (PLMN not allowed) is a 5GMM cause which is sent to the UE (100) by the wireless communication network when the UE (100) requests service, or when the wireless communication network initiates a de-registration request in a PLMN where the UE (100) by subscription or due to operator determined barring is not allowed to operate.

The cause value #12 (Tracking area not allowed) is a 5GMM cause which is sent to the UE (100) when the UE (100) requests for service, or if the wireless communication network initiates a de-registration request in a tracking area where the HPLMN or SNPN determines that the UE (100), by subscription is not allowed to operate. The cause value #13 (Roaming not allowed in this tracking area): is a 5GMM cause is sent to the UE (100) which requests service or when the wireless communication network initiates a de-registration request in a tracking area of a PLMN or SNPN which by subscription offers roaming to that the UE (100) but not in that tracking area. The cause value #15 (No suitable cells in tracking area) is a 5GMM cause is sent to the UE (100) when the UE (100) requests service, or if the wireless communication network initiates a de-registration request in a tracking area where the UE (100) by subscription is not allowed to operate but when the UE (100) should find another allowed tracking area in the same PLMN or an equivalent PLMN or the same SNPN. The causes basically indicates an action from the wireless communication network to the UE (100) based on the current location of the UE (100) thus any new causes which can get introduced in the standard which has a significance on the location of the UE (100) the proposed method will be applicable to that cause too. The main problem is when the UE (100) initiates the registration procedure which may be due to a change in current location thus during the procedure if an action is initiated by the wireless communication network in the form of the deregistration procedure, carrying the specific cause value which has significance of location of the UE (100) like #11, #12, #13, #15 that action has to be neglected by both the UE (100) and the wireless communication network otherwise there is a mismatch in the action initiated by the wireless network assuming that the UE (100) is in location-1 whereas the UE (100) is actually is in location-2 thus in the embodiment its proposed that first network should get updated with the new correct location of the UE (100) after that if the wireless communication network is sure that same action is applicable even for location-2 then the wireless communication network can execute the action even for location-2 for example by re-executing the deregistration procedure.

The registration procedure in the embodiment is analogues to the tracking area update procedure, attach procedure, registration procedure for initial registration, registration procedure for the mobility and periodic registration update.

The deregistration procedure in the embodiment is analogues to detach procedure.

In an embodiment, the registration procedure in this embodiment can be initiated by the UE (100) for any of the reasons known in the prior art and may not be restricted only for the change in the location area (i.e. not only when UE (100) moves out of the registered area) of the UE (100).

In an embodiment, the queue generation engine (166) is configured to generate a first queue and a second queue. The first queue includes at least one NAS Signalling message pending for transmission at the UE (100). The second queue includes a plurality of control plane user data pending for transmission at the UE (100). The first queue is of higher priority than the second queue to ensure that the NAS Signalling messages are transmitted to the wireless communication network without any delay. Therefore, even if the NAS Signalling message and control plane user data such as for example Cellular Internet of Things (CIoT) data transfer is sent via the same NAS Signalling connection using a single pair of NAS count, the NAS Signalling messages are not delayed due to prioritization of the queues.

In an embodiment, the NAS Signalling management engine (168) is configured to determine an initiation of the NAS message for the transmission of the control plane user data to the wireless communication network in a connected mode and also determine whether the first queue comprises at least one NAS Signalling message pending at the UE (100). Further, the NAS Signalling management engine (168) is configured to perform one of: transmit the at least one NAS Signalling message pending at the UE (100) from the first queue and then transmit the control plane user data from the second queue to the wireless communication network after the transmission of the at least one NAS Signalling message pending at the UE (100), in response to determining that the first queue comprises the at least one NAS Signalling message pending at the UE (100); and transmit the control plane user data from the second queue to the wireless communication network, in response to determining that the first queue does not comprise the at least one NAS Signalling message pending at the UE (100). The NAS message for the transmission of the control plane user data is one of a uplink (UL) NAS TRANSPORT message and an EPS Session Management (ESM) DATA TRANSPORT message. The at least one NAS Signalling message is one of registration request message and a tracking area update (TAU) request message.

Although the FIG. 1A shows the hardware elements of the UE (100) but it is to be understood that other embodiments are not limited thereon. In other embodiments, the UE (100) may include less or more number of elements. Further, the labels or names of the elements are used only for illustrative purpose and does not limit the scope of the invention. One or more components can be combined together to perform same or substantially similar function.

Figure 1B:
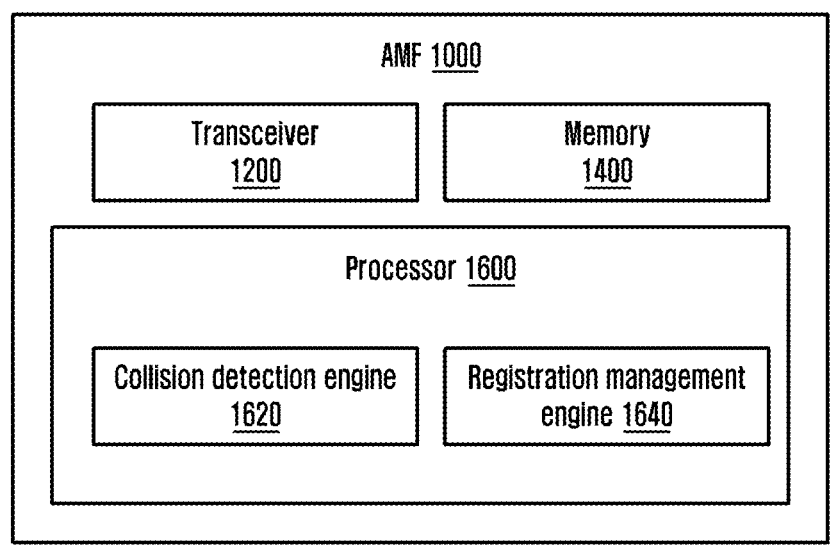
FIG. 1B is a block diagram of an access and mobility management function (AMF) (1000) for handling the collision between the registration procedure initiated by the UE (100) and the deregistration procedure initiated by the wireless communication network, according to the embodiments as disclosed herein.

FIG. 1B is a block diagram of the access and mobility management function (AMF) (1000) for handling the collision between the registration procedure initiated by the UE (100) and the deregistration procedure initiated by the wireless communication network, according to the embodiments as disclosed herein.

Referring to the FIG. 1B, the AMF (1000) includes a transceiver (1200), a memory (1400) and a processor (1600).

In an embodiment, the transceiver (1200) is configured to initiate the deregistration procedure by sending the deregistration request message to the UE (100) and receive the registration request message from the UE (100) for performing the registration procedure for the mobility and periodic registration update.

The memory (1400) can include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (1400) may, in some examples, be considered a non-transitory storage medium. The term "non-transitory" may indicate that the storage medium is not embodied in a carrier wave or a propagated signal. However, the term "non-transitory" should not be interpreted that the memory (1400) is non-movable. In some examples, the memory (1400) is configured to store larger amounts of information than the memory. In certain examples, a non-transitory storage medium may store data that can, over time, change (e.g., in Random Access Memory (RAM) or cache).

The processor (1600) includes a collision detection engine (1620) and a registration management engine (1640). In an embodiment, the collision detection engine (1620) is configured to determine that the registration request message from the UE (100) is received before receiving a deregistration accept message from the UE (100) and detect the collision between the registration procedure initiated by the UE (100) and the deregistration procedure initiated by the wireless communication network. The deregistration accept message indicates response of the deregistration procedure initiated by the wireless communication network. Further, the collision detection engine (1620) is also configured to determine whether the deregistration request message comprises the specific cause value for the deregistration procedure. The specific cause value for the deregistration procedure is at least one of #11, #12, #13 and #15.

In an embodiment, the registration management engine (1640) is configured to handle the collision between the registration procedure initiated by the UE (100) and the deregistration procedure initiated by the wireless communication network by performing one of: abort the deregistration procedure initiated by the wireless communication network and proceeding with the registration procedure initiated by the UE (100), in response to determining that the cause value received in the deregistration request message is one of the specific cause value for the deregistration procedure, and abort the registration procedure initiated by the UE (100) and proceeding with the deregistration procedure initiated by the wireless communication network, in response to determining that the cause value received in the deregistration request message is not one of the specific cause value for the deregistration procedure.

Although the FIG. 1B shows the hardware elements of the AMF (1000) but it is to be understood that other embodiments are not limited thereon. In other embodiments, the AMF (1000) may include less or more number of elements. Further, the labels or names of the elements are used only for illustrative purpose and does not limit the scope of the invention. One or more components can be combined together to perform same or substantially similar function.

Figure 2A:
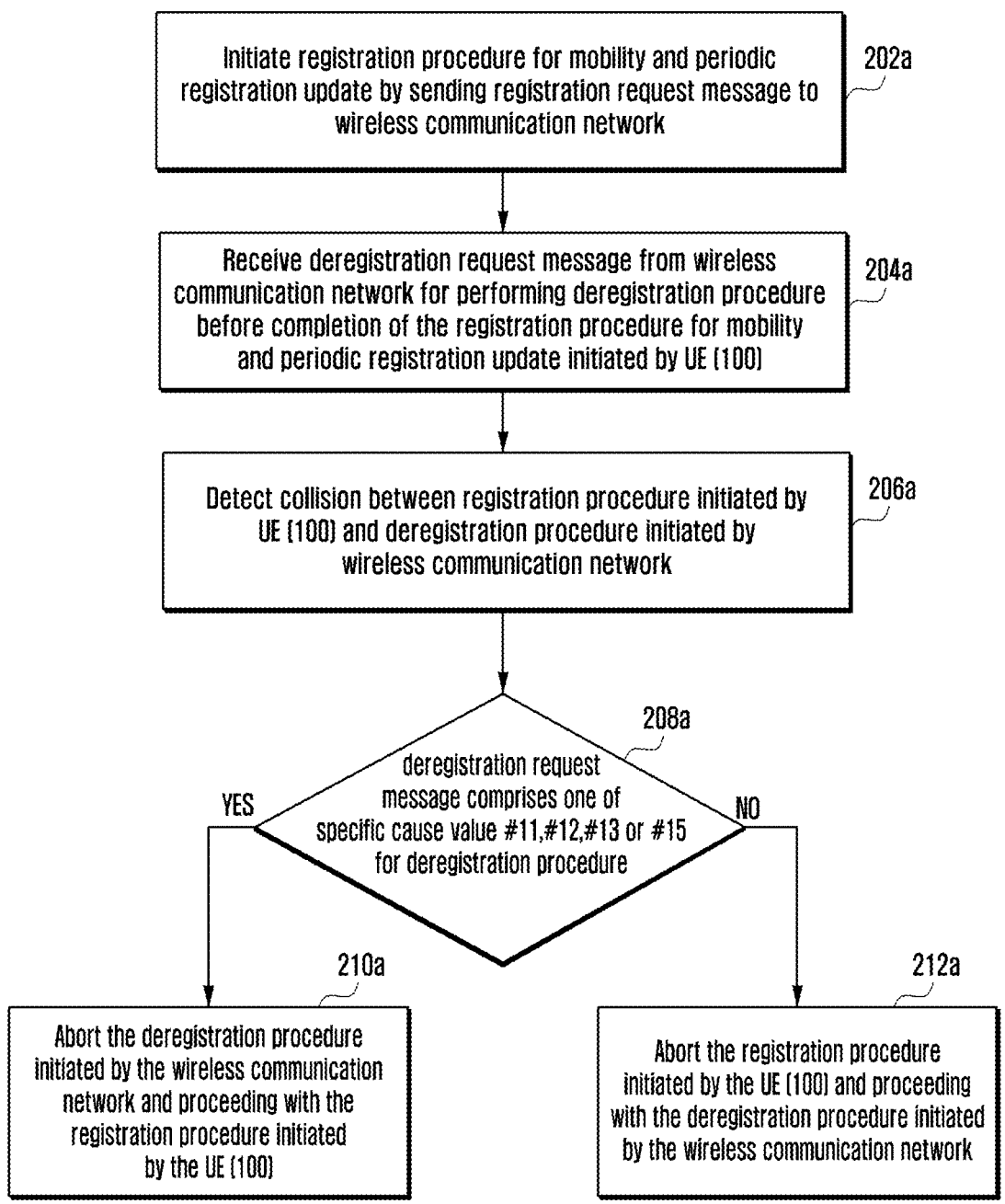
FIG. 2A is a flow chart illustrating a method for handling the collision between the registration procedure initiated by the UE (100) and the deregistration procedure initiated by the wireless communication network at the UE (100), according to the embodiments as disclosed herein.

FIG. 2A is a flow chart illustrating a method for handling the collision between the registration procedure initiated by the UE (100) and the deregistration procedure initiated by the wireless communication network at the UE (100), according to the embodiments as disclosed herein.

Referring to the FIG. 2A, at step 202a, the UE (100) initiates the registration procedure for the mobility and periodic registration update by sending the registration request message to the wireless communication network. For example, in the UE (100) as illustrated in the FIG. 1A, the processor (160) can be configured to initiate the registration procedure for the mobility and periodic registration update by sending the registration request message to the wireless communication network.

At step 204a, the UE (100) receives the deregistration request message from the wireless communication network for performing the deregistration procedure before completion of the registration procedure for the mobility and periodic registration update initiated by UE (100). For example, in the UE (100) as illustrated in the FIG. 1A, the communicator (120) can be configured to receive the deregistration request message from the wireless communication network for performing the deregistration procedure before completion of the registration procedure for the mobility and periodic registration update initiated by UE (100).

At step 206a, the UE (100) detects the collision between the registration procedure initiated by UE (100) and the deregistration procedure initiated by the wireless communication network. For example, in the UE (100) as illustrated in the FIG. 1A, the processor (160) can be configured to detect the collision between the registration procedure initiated by UE (100) and the deregistration procedure initiated by the wireless communication network.

At step 208a, the UE (100) determines whether the deregistration request message comprises one of the specific cause #11, #12, #13 and #15 for the deregistration procedure. For example, in the value UE (100) as illustrated in the FIG. 1A, the processor (160) can be configured to determine whether the deregistration request message comprises the cause for the deregistration procedure.

At step 210a, in response to determining that the deregistration request message comprises the specific cause value for the deregistration procedure, the UE (100) aborts the deregistration procedure initiated by the wireless communication network and proceeds with the registration procedure initiated by the UE (100). For example, in the UE (100) as illustrated in the FIG. 1A, the processor (160) can be configured to abort the deregistration procedure initiated by the wireless communication network and proceeds with the registration procedure initiated by the UE (100).

At step 212a, in response to determining that the deregistration request message does not comprises the specific cause value for the deregistration procedure, the UE (100) aborts the registration procedure initiated by the UE (100) and proceeds with the deregistration procedure initiated by the wireless communication network. For example, in the UE (100) as illustrated in the FIG. 1A, the processor (160) can be configured to abort the registration procedure initiated by the UE (100) and proceeds with the deregistration procedure initiated by the wireless communication network.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 2B:
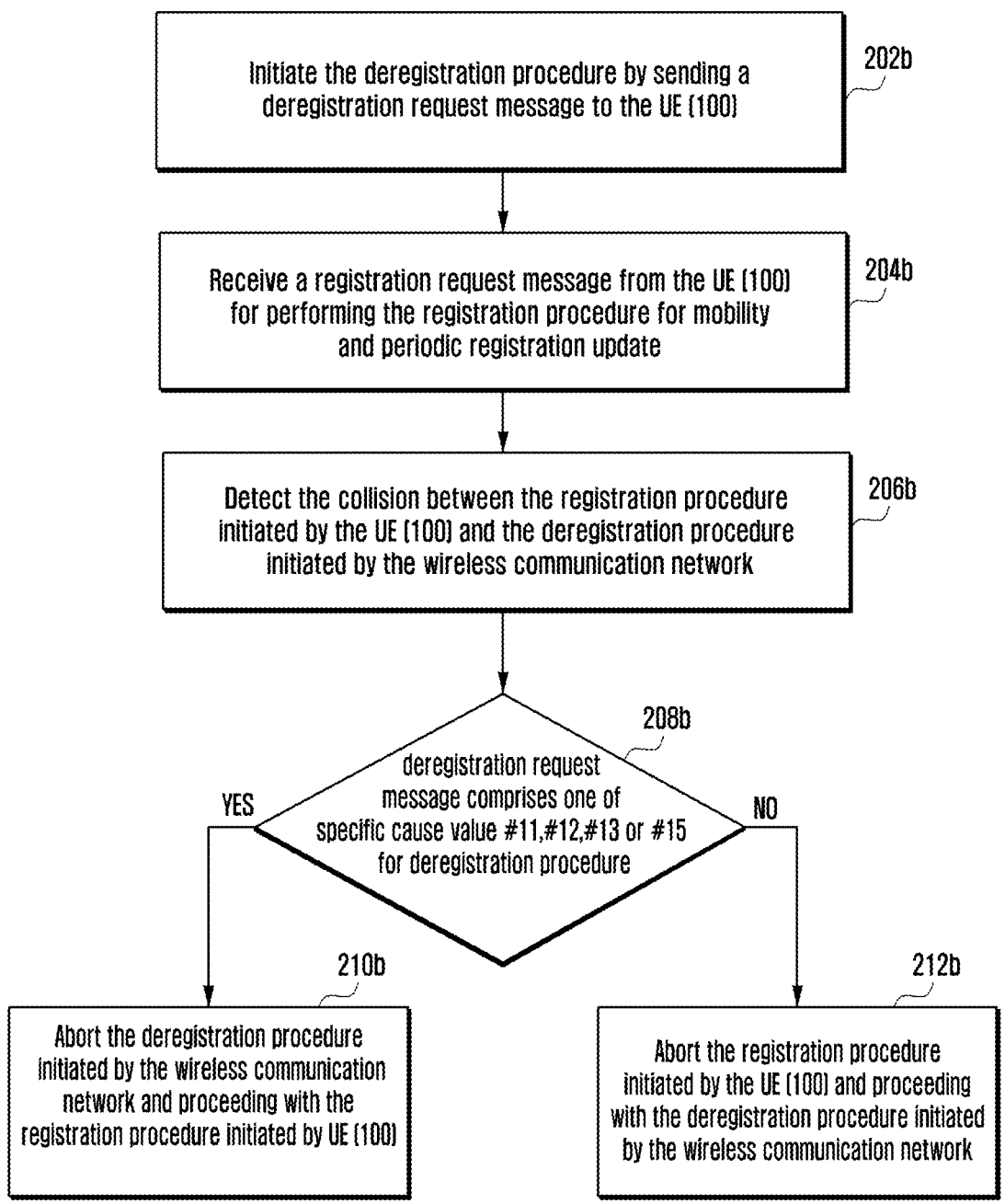
FIG. 2B is a flow chart illustrating a method for handling the collision between the registration procedure initiated by the UE (100) and the deregistration procedure initiated by the wireless communication network at the wireless communication network, according to the embodiments as disclosed herein.

FIG. 2B is a flow chart illustrating a method for handling the collision between the registration procedure initiated by the UE (100) and the deregistration procedure initiated by the wireless communication network at the wireless communication network, according to the embodiments as disclosed herein.

Referring to the FIG. 2B, at step 202b, the AMF (1000) initiates the deregistration procedure by sending the deregistration request message to the UE (100). For example, in the AMF (1000) as illustrated in the FIG. 1B, the processor (1600) can be configured to initiates the deregistration procedure by sending the deregistration request message to the UE (100).

At step 204b, the AMF (1000) receives the registration request message from the UE (100) for performing the registration procedure for the mobility and periodic registration update. For example, in the AMF (1000) as illustrated in the FIG. 1B, the communicator (1600) can be configured to receives the registration request message from the UE (100) for performing the registration procedure for the mobility and periodic registration update.

At step 206b, the AMF (1000) detects the collision between the registration procedure initiated by the UE (100) and the deregistration procedure initiated by the wireless communication network. For example, in the AMF (1000) as illustrated in the FIG. 1B, the processor (1600) can be configured to detect the collision between the registration procedure initiated by the UE (100) and the deregistration procedure initiated by the wireless communication network.

At step 208b, the AMF (1000) determines whether the deregistration request message comprises one of the cause #11, #12, #13 and #15 for the deregistration procedure. For example, in the AMF (1000) as illustrated in the FIG. 1B, the processor (1600) can be configured to determine whether the deregistration request message comprises the cause for the deregistration procedure.

At step 210b, in response to determining that the deregistration request message comprises the cause for the deregistration procedure, the AMF (1000) aborts the deregistration procedure initiated by the wireless communication network and proceeds with the registration procedure initiated by UE (100). For example, in the AMF (1000) as illustrated in the FIG. 1B, the processor (1600) can be configured to abort the deregistration procedure initiated by the wireless communication network and proceed with the registration procedure initiated by UE (100).

At step 212*b*, in response to determining that the deregistration request message does not comprise the cause for the deregistration procedure, the AMF (1000) aborts the registration procedure initiated by the UE (100) and proceeds with the deregistration procedure initiated by the wireless communication network. For example, in the AMF (1000) as illustrated in the FIG. 1B, the processor (1600) can be configured to abort the registration procedure initiated by the UE (100) and proceed with the deregistration procedure initiated by the wireless communication network.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 2C:
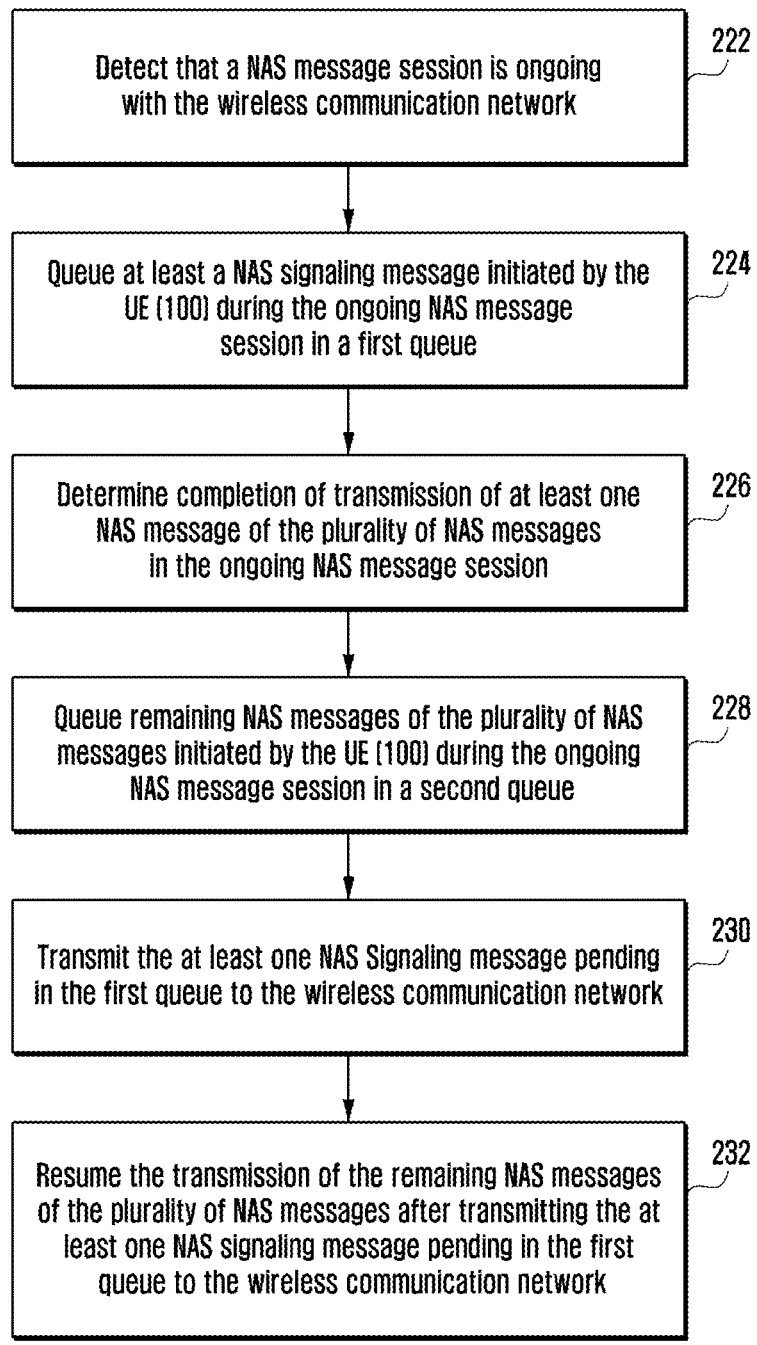
FIG. 2C is a flow chart illustrating a method for managing non-access stratum (NAS) Signalling by the UE (100) in the wireless communication network, according to the embodiments as disclosed herein.

FIG. 2C is a flow chart illustrating a method for managing the NAS Signalling by the UE (100) in the wireless communication network, according to the embodiments as disclosed herein.

Referring to the FIG. 2C, at step 222, the UE (100) detects that the NAS message session is ongoing with the wireless communication network. For example, in the UE (100) as illustrated in the FIG. 1A, the processor (160) can be configured to detect that the NAS message session is ongoing with the wireless communication network.

At step 224, the UE (100) queues the at least one NAS signaling message initiated by the UE (100) during the ongoing NAS message session in the first queue. For example, in the UE (100) as illustrated in the FIG. 1A, the processor (160) can be configured to queues the at least one NAS signaling message initiated by the UE (100) during the ongoing NAS message session in the first queue.

At step 226, the UE (100) determines the completion of transmission of the at least one NAS message of the plurality of NAS messages in the ongoing NAS message session. For example, in the UE (100) as illustrated in the FIG. 1A, the processor (160) can be configured determine the completion of transmission of the at least one NAS message of the plurality of NAS messages in the ongoing NAS message session.

At step 228, the UE (100) queues the remaining NAS messages of the plurality of NAS messages initiated by the UE (100) during the ongoing NAS message session in the second queue. For example, in the UE (100) as illustrated in the FIG. 1A, the processor (160) can be configured to queue the remaining NAS messages of the plurality of NAS messages initiated by the UE (100) during the ongoing NAS message session in the second queue.

At step 230, the UE (100) transmits the at least one NAS signaling message pending in the first queue to the wireless communication network. For example, in the UE (100) as illustrated in the FIG. 1A, the processor (160) can be configured to transmit the at least one NAS signaling message pending in the first queue to the wireless communication network.

At step 232, the UE (100) resumes the transmission of the remaining NAS messages of the plurality of NAS messages after transmitting the at least one NAS signaling message pending in the first queue to the wireless communication network. For example, in the UE (100) as illustrated in the FIG. 1A, the processor (160) can be configured to resume the transmission of the remaining NAS messages of the plurality of NAS messages after transmitting the at least one NAS signaling message pending in the first queue to the wireless communication network.

The various actions, acts, blocks, steps, or the like in the method may be performed in the order presented, in a different order or simultaneously. Further, in some embodiments, some of the actions, acts, blocks, steps, or the like may be omitted, added, modified, skipped, or the like without departing from the scope of the invention.

Figure 3A:
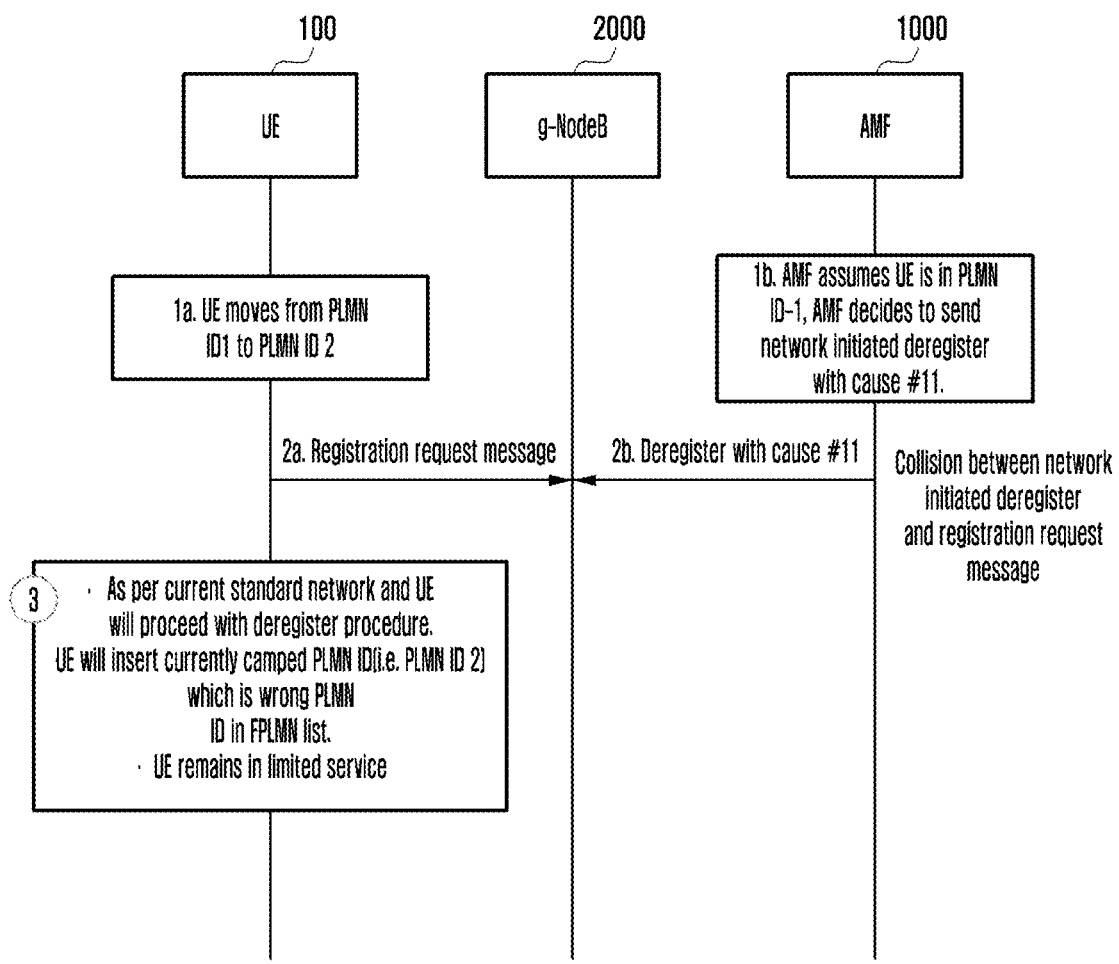
FIG. 3A is a Signalling diagram illustrating the collision between the registration procedure initiated by the UE (100) and the deregistration procedure initiated by the wireless communication network, according to the prior art.

FIG. 3A is a Signalling diagram illustrating the collision between the registration procedure initiated by the UE (100) and the deregistration procedure initiated by the wireless communication network, according to the prior art.

Consider a scenario where the UE (100) is in an INACTIVE state on a PLMN ID1. The AMF (1000) has the UE context and knows that the UE (100) is on the PLMN ID 1 (step 1*b*).

At step 1*a*, the UE (100) moves from the PLMN ID 1 to PLMN ID-2 and initiates the registration procedure by sending the registration request message (step 2*a*).

Simultaneously on the network side, at step 1*b*, a PLMN ID-1 agreement expires with the AMF (1000) and hence, the AMF (1000) initiates the deregistration procedure with the cause #11 PLMN NOT ALLOWED by sending the deregistration request message to the UE (100) (step 2*b*). Therefore, a scenario of collision of the registration procedure initiated by the UE (100) and the deregistration procedure initiated by the network is created. In general, the UE (100) is expected to populate the PLMN-ID1 in a forbidden PLMN (FPLMN) list and based on the FPLMN list, the UE (100) will never try to receive service on the PLMN ID 1.

However, at step 3, the UE (100) and the network aborts the registration procedure triggered by the UE (100) on determining that the network has initiated the deregistration procedure simultaneously. Further, as the UE (100) receives the deregistration request message with cause #11, the UE (100) will populate the currently camped PLMN ID in the forbidden PLMN list i.e., PLMN ID 2 is in the FPLMN list. However, according to the step 2*b*, the AMF intended to populate the PLMN ID 1 in the FPLMN list and not the PLMN ID 2 as it is done currently. Therefore, a wrong PLMN ID is populated in the FPLMN list as a result of which the UE (100) will never try to receive service (i.e., no registration request) on the PLMN ID 2 and the UE (100) will remain in limited service in all the areas where only the PLMN ID 2 is available.

Figure 3B:
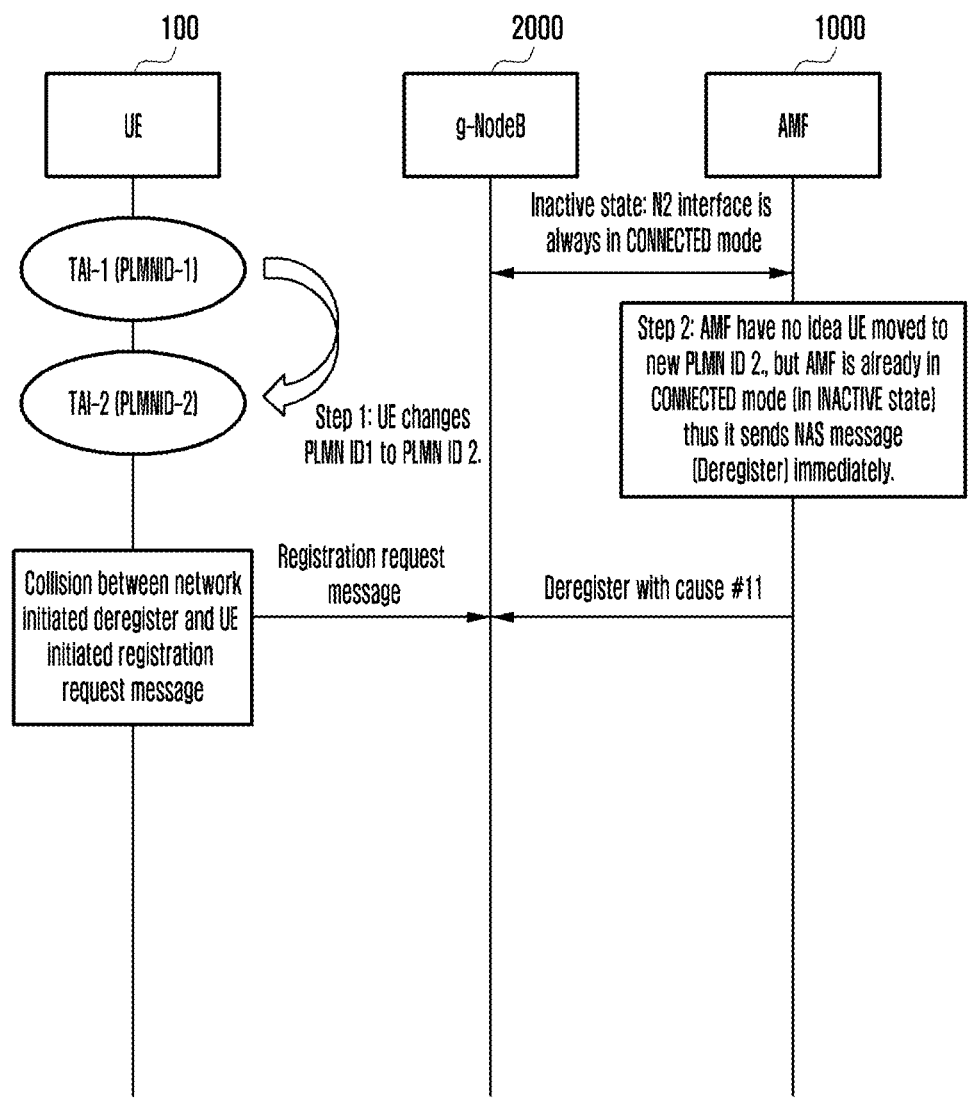
FIG. 3B is a Signalling diagram illustrating the collision arising when the UE (100) is in the INACTIVE state, according to the prior art.

FIG. 3B is a Signalling diagram illustrating the collision arising when the UE (100) is in the INACTIVE state, according to the prior art.

Referring to the FIG. 3B, at step 1, the UE (100) moves from the PLMN ID1 to the PLMN ID 2. At step 2, the AMF (1000) have no idea that the UE (100) has moved to the PLMN ID 2, but the AMF (1000) is already in the CONNECTED mode (in INACTIVE state) thus the AMF (1000) sends NAS message (Deregister) immediately to the UE (100) which leads to the collision between the registration request message triggered by the UE (100) and the deregistration request triggered by the AMF (1000).

In an IDLE mode, the AMF (1000) or the MME (4000) will initiate paging and the RRC procedure gets executed due to which the AMF (1000)/MME (4000) will know the correct PLMN ID (as part of RRC procedure and S1-AP procedure) before sending the NAS PDU (Deregistration request). After knowing that the UE (100) E is on the PLMN ID 2, the AMF (1000)/MME (4000) will not send the deregistration request message to the UE (100).

Figure 3C:
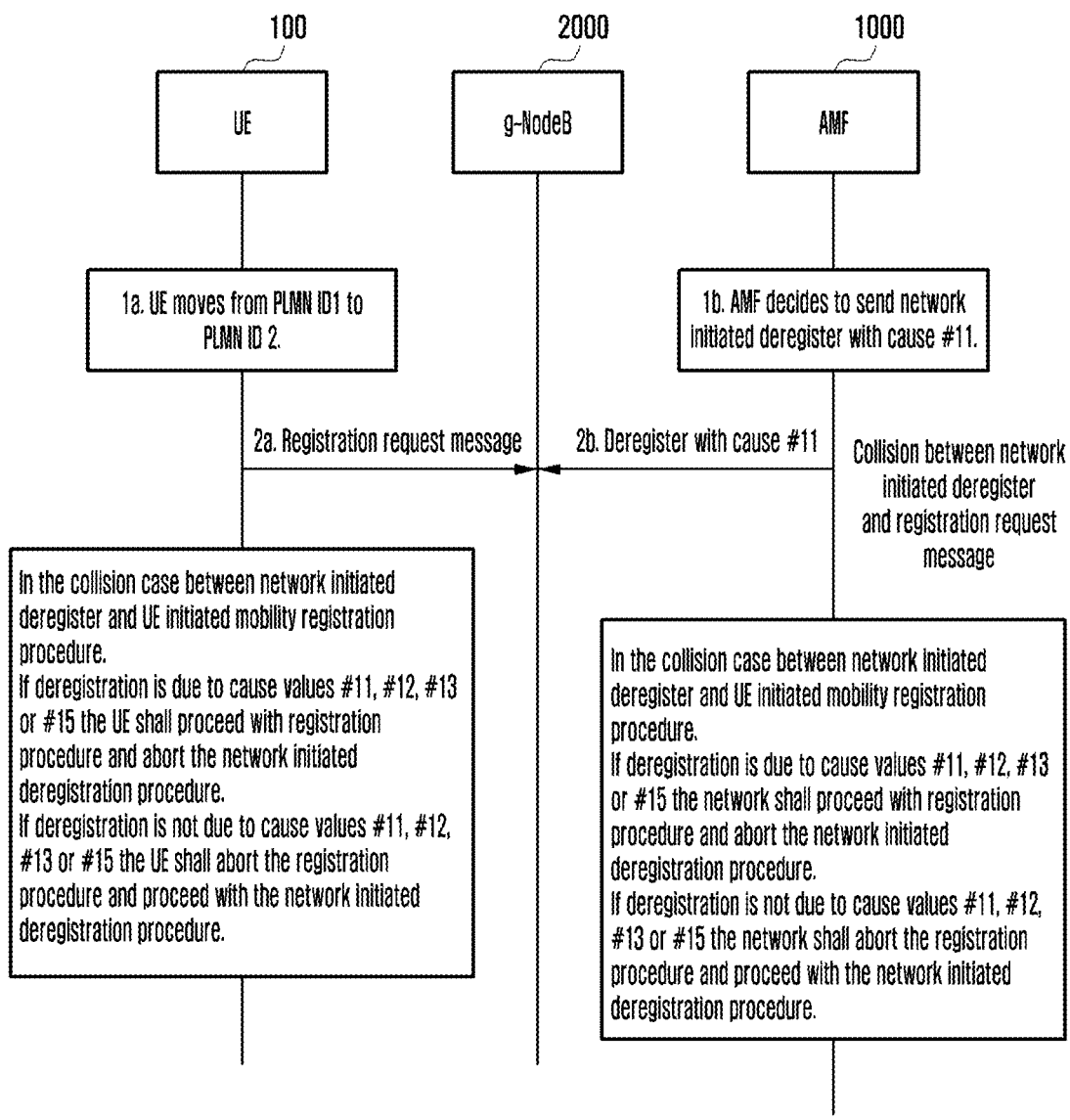
FIG. 3C is a Signalling diagram illustrating the method for handling the collision between the registration procedure initiated by the UE (100) and the deregistration procedure initiated by the wireless communication network, according to the embodiments as disclosed herein.

FIG. 3C is a Signalling diagram illustrating the method for handling the collision between the registration procedure initiated by the UE (100) and the deregistration procedure initiated by the wireless communication network, according to the embodiments as disclosed herein.

Referring to the FIG. 3C in conjunction with the FIG. 3A, the steps 1a to 2b in the FIG. 3C are substantially the same as the steps 1a to 2b in the FIG. 3A, and hence repeated description is omitted.

At step 3a, the UE (100) determines whether the deregistration request message includes at least one of #11, #12, #13 and #15 as the 5GMM cause for the deregistration procedure. Further, the UE (100) aborts the deregistration procedure initiated by the wireless communication network and proceeds with the registration procedure initiated by the UE (100) on determining that the deregistration request message includes at least one of #11, #12, #13 and #15 as the 5GMM cause for the deregistration procedure before the registration procedure for mobility and periodic registration update has been completed. Also, the UE (100) aborts the registration procedure initiated by the UE (100) and proceeds with the deregistration procedure initiated by the wireless communication network on determining that the deregistration request message does not include at least one of #11, #12, #13 and #15 as the 5GMM cause for the deregistration procedure.

Similarly, at step 3b, wireless communication network determines whether the deregistration request message sent to the UE (100) includes at least one of #11, #12, #13 and #15 as the 5GMM cause for the deregistration procedure. Further, the wireless communication network aborts the deregistration procedure initiated by the wireless communication network and proceeds with the registration procedure initiated by the UE (100) on determining that the deregistration request message includes at least one of #11, #12, #13 and #15 as the 5GMM cause for the deregistration procedure before the registration procedure for mobility and periodic registration update has been completed. Also, the wireless communication network aborts the registration procedure initiated by the UE (100) and proceeds with the deregistration procedure initiated by the wireless communication network on determining that the deregistration request message does not include at least one of #11, #12, #13 and #15 as the 5GMM cause for the deregistration procedure.

Figure 4A:
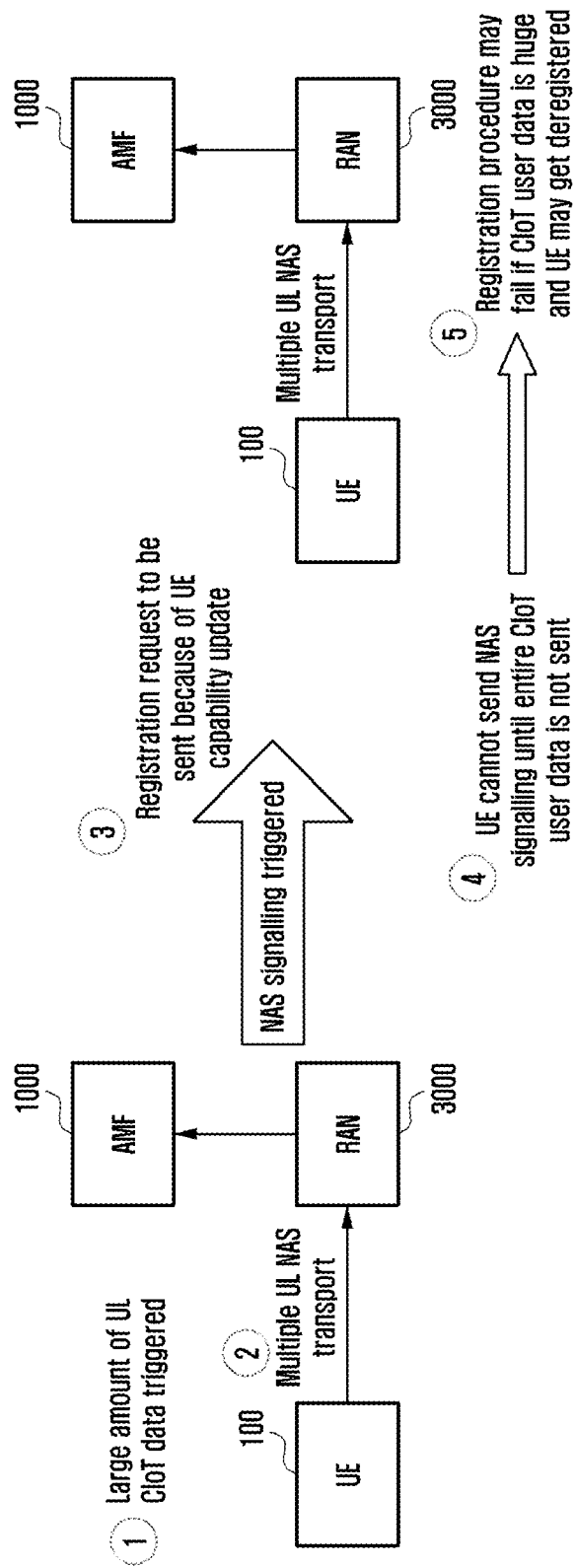
FIG. 4A illustrates a scenario of a failure in transmission of the NAS Signalling message due to a large amount of Cellular Internet of Things (CIoT) user data being transmitted by the UE (100) in 5G communication network, according to the prior art.

FIG. 4A illustrates a scenario of a failure in the transmission of the NAS Signalling message due to a large amount of CIoT user data being transmitted by the UE (100) in 5G communication network, according to the prior art.

When the CIoT user data is large the UE (100) takes a long time to complete the CIoT UL user data transmission. However, the NAS Signalling message transmission and the CIoT UL user data is transmitted through the same NAS Signalling connection using a same pair of NAS count. Therefore, the transmission of the NAS Signalling message at a time when the CIoT UL user data transmission is on-going is queued, which results in significant delay in the transmission of the NAS Signalling message. Further, the delay in the transmission of the NAS Signalling message widens if the serving PLMN data control and 3GPP Enhanced Coverage feature are also enabled by the wireless communication network. The above mentioned issues are part of the Spec and CR193953 is added in 24.501 wherein the handling of the collision between the NAS Signalling messages and the UL NAS transport messages is dependent on the implementation of the UE (100).

Consider a scenario where CIoT 5GS optimization is enabled. In a CIoT small data container (as described in section 9.11.3.18B of the specification 3gpp 24.501) an information element is used to encapsulate the CIoT user data, SMS, or location services message with a size that is not more than 254 octets between the UE (100) and the AMF (1000) when the control plane CIoT 5GS optimization is enabled. The CIoT small data container is a type 4 information element with a minimum length of 4 octets and a maximum length of 257 octets (as shown below).

| 8 | 7 | 6 | 5 | 4 | 3 | 2 | 1 | |
|---|---|---|---|---|---|---|---|---|
| CIoT small data container IEI ||||||||  octet 1 |
| Length of CIoT small data container contents |||||||| octet 2 |
| CIoT small data container contents |||||||| octet 3 |
| |||||||| octet 257 |

Therefore, the transmission of a large CIoT user data needs transmission of multiple CIoT small data container carrying a part of the large CIoT user data. Also, during the transmission of the multiple CIoT small data container, if the NAS Signalling messages related to for example the TAU update or the registration needs to be sent, then the same is delayed until the completion of the transmission of multiple CIoT small data container.

Further, the serving PLMN rate control protects the AMF (1000) and Signalling radio bearers in an E-UTRA from the load generated by the user data over control plane. A Session Management Function (SMF) informs the UE (100) of any local serving PLMN rate control during the PDU session establishment procedure (as described in sub clause 6.4.1 of 3gpp 24.501) or the PDU session modification procedure (as described in sub clause 6.4.2 of the 3gpp 24.501). If the serving PLMN rate control is enabled, the SMF starts the serving PLMN rate control for the PDU session when the first control plane user data is received over the PDU session. The UE (100) limits the rate at which the uplink control plane user data is generated to comply with the serving PLMN policy provided by the wireless communication network. The indicated rate in the NAS procedure applies to the PDU session the NAS procedure corresponds to, and the indicated rate is valid until the PDU session is released.

Further, a PUSCH repetition in the CIoT can be configured under coverage enhancement (CE) Mode B which has coverage up to 15 dB coverage enhancement with reference to that of a UE Category 1. A transmission power for both Physical Uplink Control Channel (PUCCH) and Physical Uplink Shared Channel (PUSCH) is set to be MAX. Since the power does not change (i.e., no power control is performed) DCI format 6-0B and 6-1B does not carry TPC (Transmission Power Control) field.

In specification 3GPP 36.213, 8.0 the UE (100) procedure for transmitting the PUSCH: i.e., the PUSCH repetition levels (DCI Format 6-0B) is provided in table. 1.

TABLE 1

| Higher layer parameter 'pusch-max NumRepetitionCEmodeB' | {n1, n2, K, n8 } |
|---|---|
| Not configured | {4,8,16,32.64,.128,256,512} |
| 192 | {1,4,8,16,32,64,128,192 } |
| 256 | {4,8, 16, 32,64,128,192,256} |
| 384 | {4,16,32, 64,128,192, 256, 384} |
| 512 | {4,16,64,128,192, 256, 384,512} |
| 768 | {8,32,128,192,256,384.512,768} |
| 1024 | {4,8,16,64,128,256,512,1024 } |
| 1536 | {4,16,64,256,512,768,1024,1536} |
| 2048 | {4,16,64,128,256,512,1024,2048 } |

A maximum of 2048 repetitions is configured by the wireless communication network if the UE (100) is operating in the CE Mode B.

Referring to the FIG. 4A, consider 500 MB amount of the CIoT user data needs to be sent to the wireless communication network in the connected mode. At step 1, the UE (100) initiates the transmission of a plurality of the UL NAS transport messages which encapsulates the CIoT small data container carrying the CIoT user data. However, in narrow band-IoT (NB-IoT) the bandwidth which is available for the uplink (UL) is very less, for example 200 KHz. Therefore, maximum amount of the CIoT user data that can be sent in the CIoT small data container is 254 Bytes. Further, in order to send 500 MB of the CIoT user data, the CIoT user data is split into multiple fragments so that the CIoT user data can be encapsulated in the CIoT small data container. Further, the encapsulated data is sent to the wireless communication network in plurality of the UL NAS transport messages (step 2) over a long duration of time.

At step 3, consider that the NAS Signalling message is triggered such as for example the registration request to be sent because of the update to the UE capability. Further, as in step 4, the NAS Signalling message cannot be sent to the wireless communication network unless all the UL NAS transport messages been sent. Due to the transmission of the UL NAS transport messages, a considerable delay in witnessed in the transmission of the NAS Signalling message resulting in the registration procedure failing and the UE (100) gets deregistered (step 5). The delay becomes worse in case the serving PLMN rate control and 3GPP enhanced coverage features are enabled in the UE (100) and the AMF (1000). When the serving PLMN Rate control is enabled the UE (100) limits the rate of generation of the uplink control plane user data to comply with the PLMN rate control policy provided by the wireless communication network. When the 3GPP enhanced coverage (CE Mode B) has been enabled by the wireless communication network the maximum number of repeated PUSCH transmissions can be 2048 in worst case scenario which adds to further delay in the transmission of the NAS Signalling message.

Figure 4B:
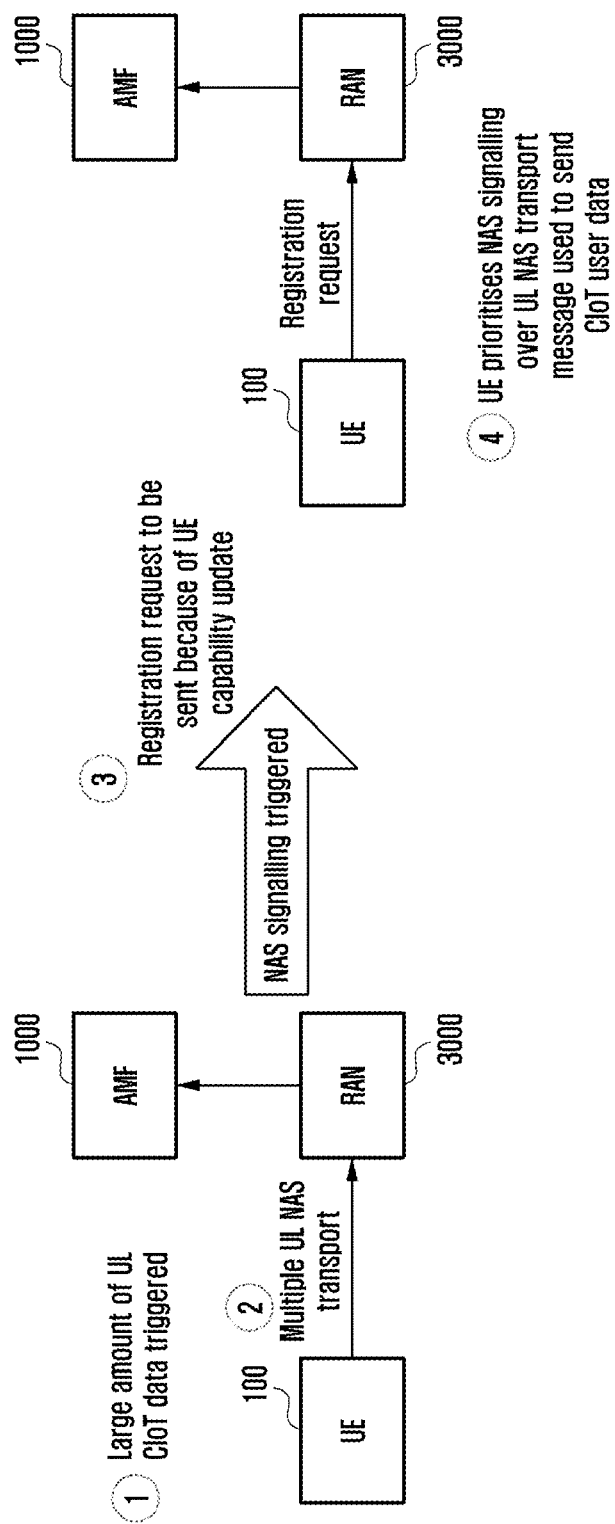
FIG. 4B illustrates a scenario of prioritizing the transmission of the NAS Signalling messages by the UE (100) over the transmission of the CIoT user data in the 5G communication network, according to the embodiments as disclosed herein.

FIG. 4B illustrates a scenario of prioritizing the transmission of the NAS Signalling messages by the UE (100) over the transmission of the CIoT user data in the 5G communication network, according to the embodiments as disclosed herein.

Referring to the FIG. 4B in conjunction with the FIG. 4A, the steps 1 to 3 in the FIG. 4B are substantially the same as the steps 1 to 3 in the FIG. 4A, and hence repeated description is omitted.

At step 4, the UE (100) prioritises the NAS Signalling messages such as for registration request due to the update in the UE capability, the TAU update, authentication, etc over the UL NAS transport messages which are used to send the CIoT user data to the wireless communication network.

The UE (100) provides a higher priority to the NAS Signalling messages by generating two queues in the NAS layer between the UE (100) and the wireless communication network. The first queue comprises the NAS Signalling messages which are pending for transmission to the wireless communication network and the second queue comprises the UL NAS transport messages. Every time the UE (100) needs to transmit the UL NAS transport messages, the UE (100) checks whether there is any content pending in the first queue and prioritizes the contents in the first queue over the contents in the second queue for transmission.

Therefore, unlike to the conventional methods and systems where in the transmission of the UL NAS transport messages leads to the delay in the transmission of the NAS Signalling messages, the proposed method ensures that the NAS Signalling messages are transmitted before the UL NAS transport messages.

Figure 5A:
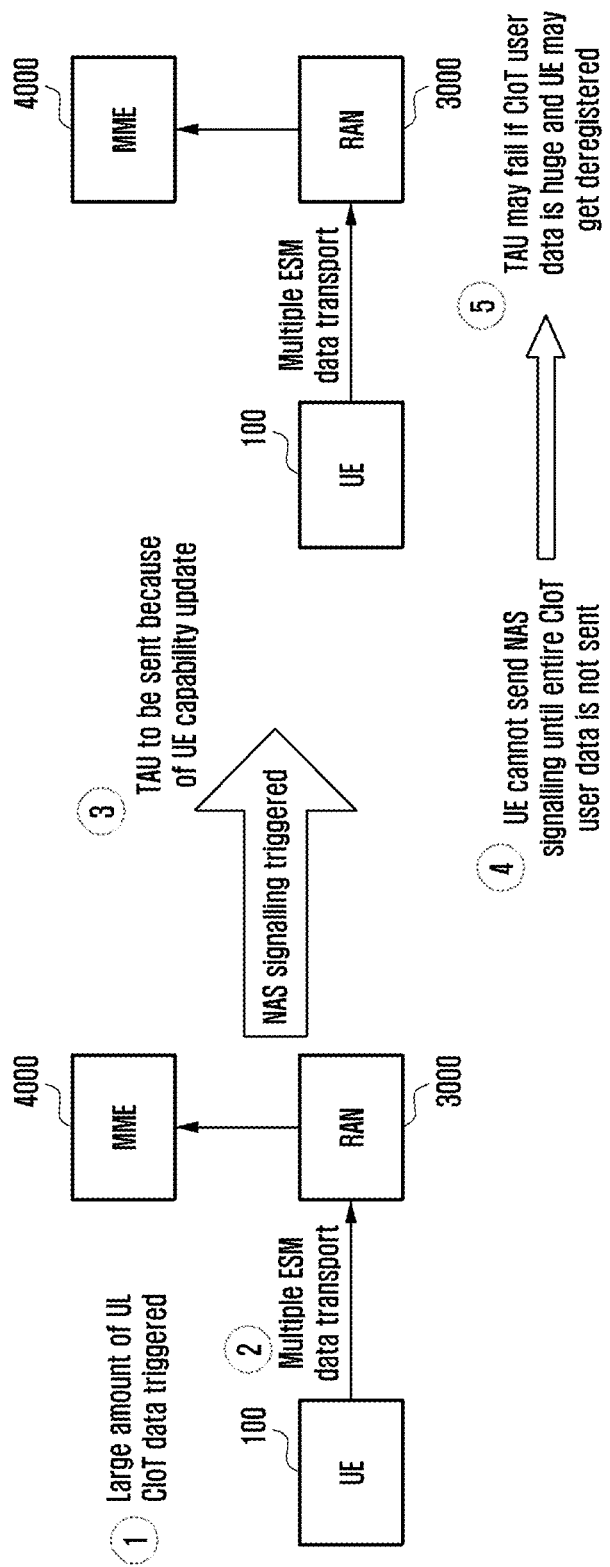
FIG. 5A illustrates a scenario of the failure in the transmission of the NAS Signalling message due to a large amount of CIoT user data being transmitted by the UE (100) in 4G communication network, according to the prior art.

FIG. 5A illustrates a scenario of the failure in the transmission of the NAS Signalling message due to a large amount of CIoT user data being transmitted by the UE (100) in 4G communication network, according to the prior art.

Referring to the FIG. 5A in conjunction with the FIG. 4A, the issues described with respect to the FIG. 4A is highlighted from the point of view of the 5G communication network. However, similar issues may be witnessed with respect to the 4G communication network for the transport of the control plane user data using the ESM DATA TRANSPORT messages.

At step 1, the UE (100) initiates the transmission of a plurality of the ESM DATA TRANSPORT messages for transmission of the control plane user data. Further, the encapsulated control plane user data is sent to the wireless communication network in plurality of the ESM DATA TRANSPORT messages (step 2) over a long duration of time.

At step 3, consider that the NAS Signalling message is triggered such as for example the TAU update because of the update to the UE capability. Further, as in step 4, the NAS Signalling message cannot be sent to the wireless communication network unless all the ESM DATA TRANSPORT messages have been sent. Due to the transmission of the ESM DATA TRANSPORT messages, a considerable delay in witnessed in the transmission of the NAS Signalling message resulting in the TAU procedure failing and the UE (100) gets deregistered (step 5). The delay becomes worse in case the serving PLMN rate control and 3GPP enhanced coverage features are enabled in the UE (100) and the AMF (1000). When the serving PLMN Rate control is enabled the UE (100) limits the rate of generation of the uplink control plane user data to comply with the PLMN rate control policy provided by the wireless communication network. When the 3GPP enhanced coverage (CE Mode B) has been enabled by the wireless communication network the maximum number of repeated PUSCH transmissions can be 2048 in worst case scenario which adds to further delay in the transmission of the NAS Signalling message.

Figure 5B:
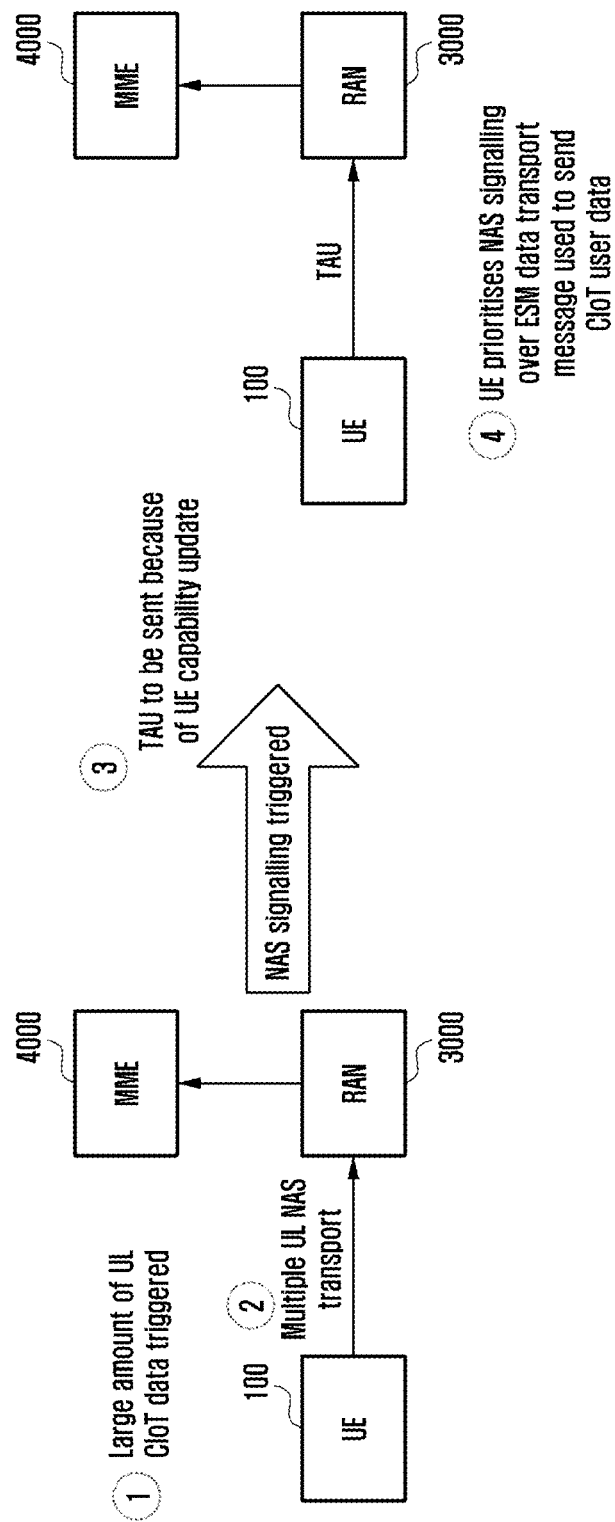
FIG. 5B illustrates a scenario of prioritizing the transmission of the NAS Signalling message by the UE (100) over the transmission of the CIoT user data in the 4G communication network, according to the embodiments as disclosed herein.

FIG. 5B illustrates a scenario of prioritizing the transmission of the NAS Signalling message by the UE (100) over the transmission of the CIoT user data in the 4G communication network, according to the embodiments as disclosed herein.

Referring to the FIG. 5B in conjunction with the FIG. 5A, the steps 1 to 3 in the FIG. 5B are substantially the same as the steps 1 to 3 in the FIG. 5A, and hence repeated description is omitted.

At step 4, the UE (100) prioritises the NAS Signalling messages such as for registration request due to the update in the UE capability, the TAU update, authentication, etc over the ESM DATA TRANSPORT messages which are used to send the CIoT user data to the wireless communication network. The UE (100) provides a higher priority to the NAS Signalling messages by generating two queues in the NAS layer between the UE (100) and the wireless communication network. The first queue comprises the NAS Signalling messages which are pending for transmission to the wireless communication network and the second queue comprises the ESM DATA TRANSPORT messages. Every time the UE (100) needs to transmit the UL NAS transport messages, the UE (100) checks whether there is any content pending in the first queue and prioritizes the contents in the first queue over the contents in the second queue for transmission. Therefore, the proposed method ensures that the NAS Signalling messages are transmitted before the ESM DATA TRANSPORT messages.

Figure 6A:
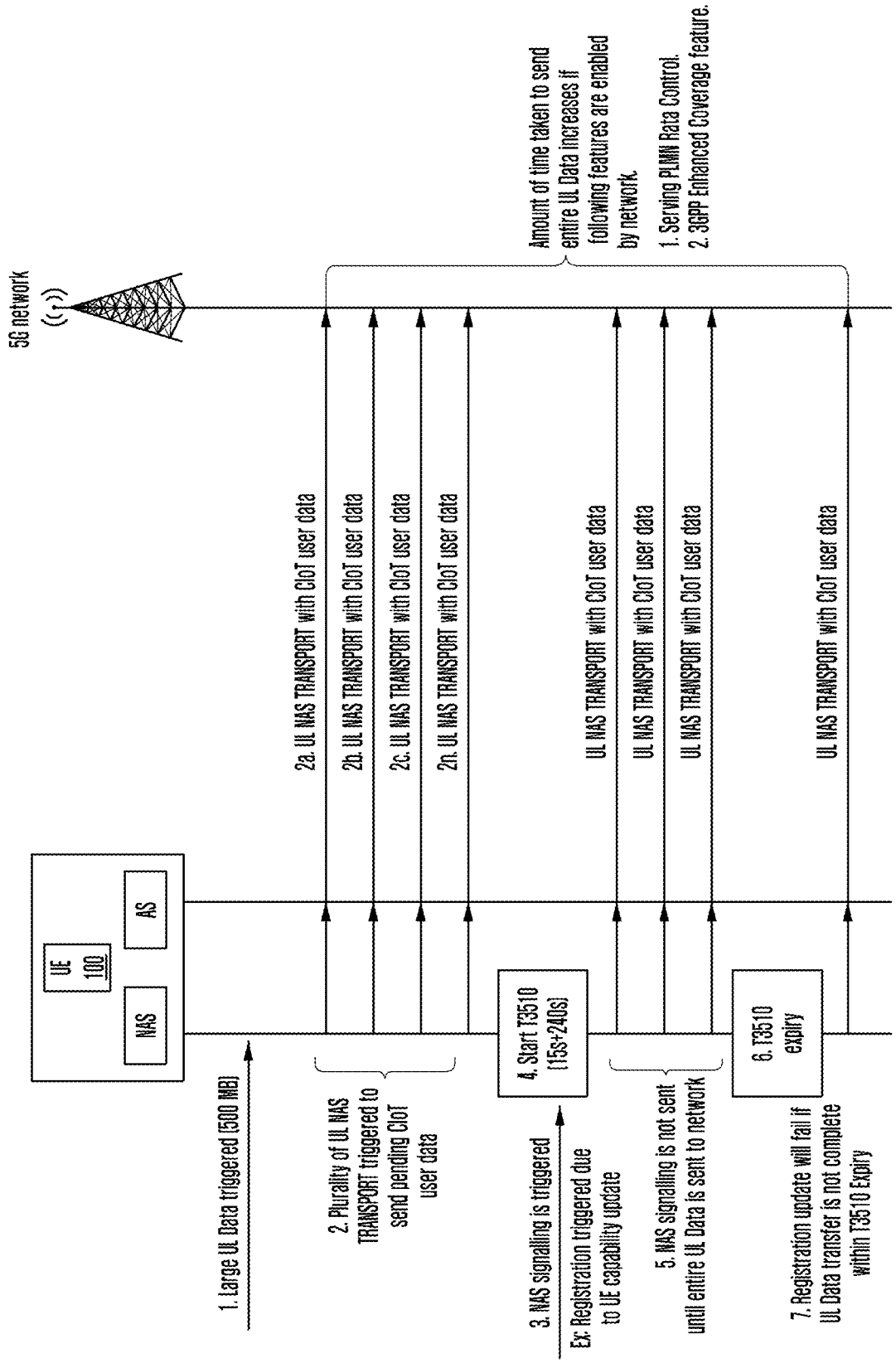
FIG. 6A is a Signalling diagram illustrating the failure in the transmission of the NAS Signalling message due to a large amount of CIoT user data being transmitted by the UE (100) in the 5G communication network, according to the prior art.

FIG. 6A is a Signalling diagram illustrating the failure in the transmission of the NAS Signalling message due to a large amount of CIoT user data being transmitted by the UE (100) in the 5G communication network, according to the prior art.

Referring to the FIG. 6A, at step 1, consider a large amount of the CIoT user data (for example 500 MB) transmission is triggered by the UE (100). At step 2, the plurality of UL NAS TRANSPORT messages is triggered to send the pending UL NAS TRANSPORT messages of the plurality of UL NAS TRANSPORT messages (as shown in steps 2a-2n). Further, the amount of time taken to complete the transmission of the plurality of UL NAS TRANSPORT messages increases if at least one of the serving PLMN data control and the 3GPP enhanced coverage feature is enabled by the wireless communication network.

At step 3, the UE (100) triggers the NAS Signalling is for example the registration request due to the UE capability update and simultaneously the UE (100) also activates the T3510 (15 s+240 s) timer (step 4). Further, at step 5, the UE (100) does not send the NAS Signalling message until the complete transmission of the plurality of UL NAS TRANSPORT messages to the wireless communication network and hence at step 6, the T3510 timer expires. The registration update fails as the transmission of the CIoT user data is not completed within the expiry of the T3510 timer. Therefore, in the conventional methods and systems, the delay in the complete transmission of the plurality of UL NAS TRANSPORT messages leads to the NAS Signalling messages not being delivered to the wireless communication network, which can result in various consequences such as the failure in the registration update at the wireless communication network.

Figure 6B:
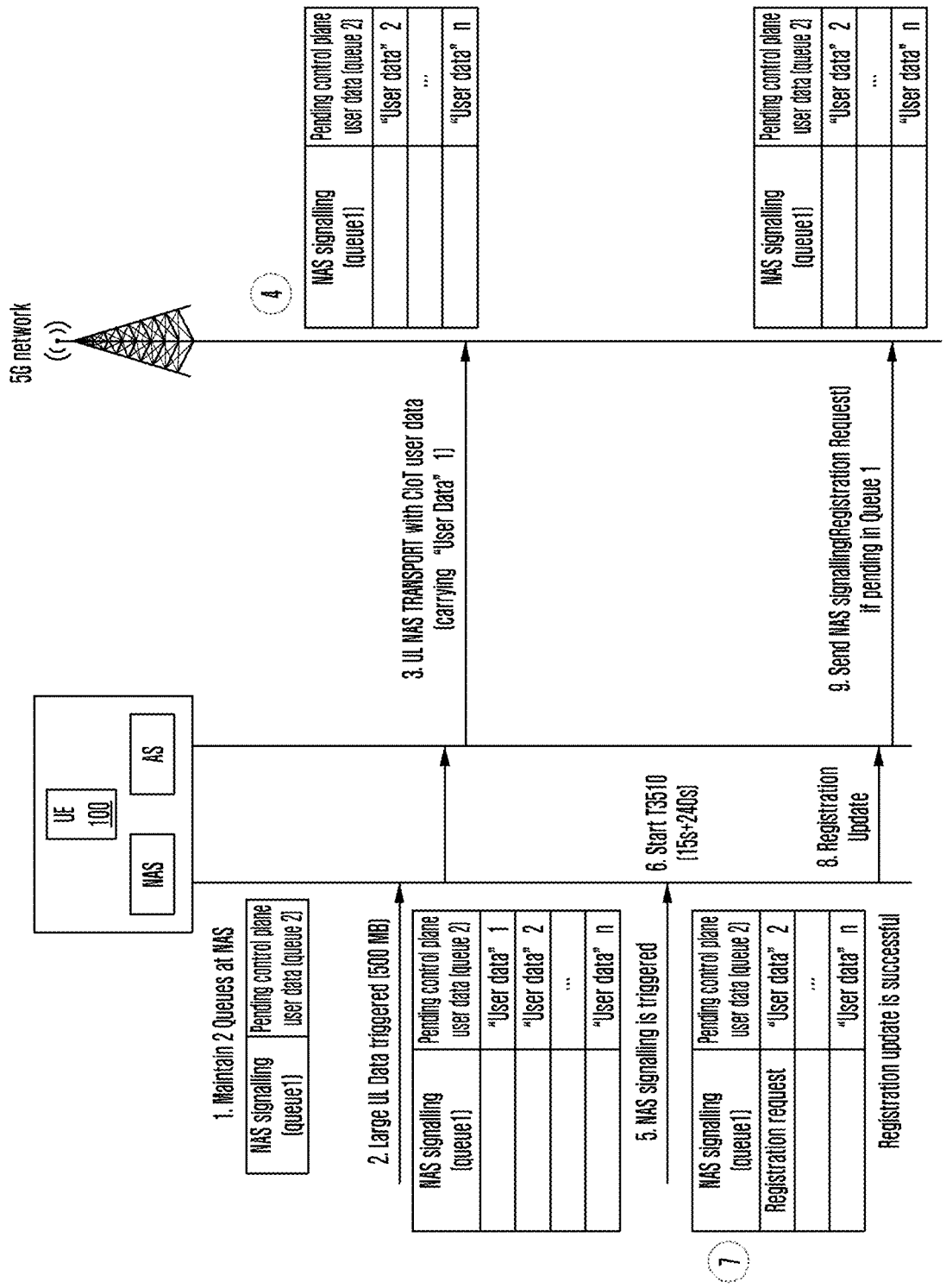
FIG. 6Ba is a Signalling diagram illustrating the prioritization of the NAS Signalling message over the CIoT user data by the UE (100) in the 5G communication network, according to the embodiments as disclosed herein.
Figure 6B:
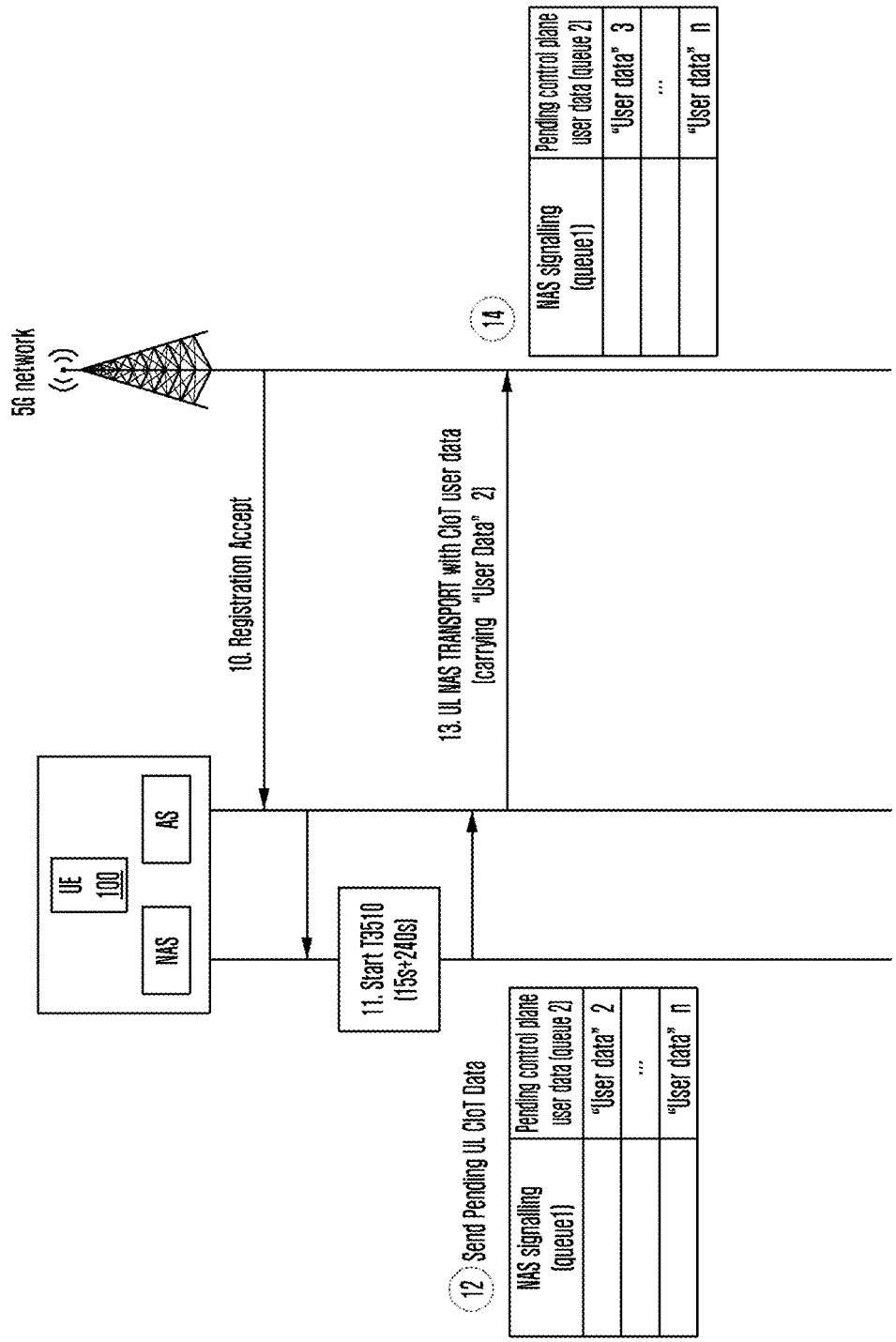

FIG. 6Ba and FIG. 6Bb are Signalling diagrams illustrating the prioritization of the NAS Signalling message over the CIoT user data by the UE (100) in the 5G communication network, according to the embodiments as disclosed herein.

Referring to the FIG. 6Ba, at step 1, the UE (100) generates two queues at the NAS layer between the UE (100) and the 5G communication network. The first queue is generated to hold the pending NAS Signalling messages and the second queue is generated to hold the pending control plane user data.

At step 2, the UE (100) triggers the transmission of the large amount of the CIoT user data for example 500 MB of CIoT user data. The UE (100) determines whether the first queue comprises at least one NAS Signalling message. On determining that the first queue does not comprise at least one NAS Signalling message, at step 3, the UE (100) transmits the UL NAS TRANSPORT message carrying "User Data 1" pending in the second queue. The control plane user data "User Data 2" is the next available control plane user data in the second queue as described at step 4.

At step 5, the UE (100) determines that the NAS Signalling is triggered for example registration request due to the UE capability update and at step 6, the UE (100) activates the T3510 (15 s+240 s) timer. Further, at step 7, before transmission of the next available UL NAS TRANSPORT message in the second queue, the UE (100) determines whether the first queue comprises at least one NAS Signalling message. On determining that the first queue comprises at least one NAS Signalling message for the registration due to the UE capability update, at step 8 the UE (100) initiates the registration update procedure by transmitting the NAS Signalling message (registration request message) from the first queue to the wireless communication network (step 9).

Referring to the FIG. 6Bb, at step 10, the UE (100) receives a registration accept message from the wireless communication network on the successful completion of the registration procedure. Further, the registration accept message is received by the UE (100) before the expiry of the T3510 (15 s+240 s) timer (step 11).

At step 12, the UE (100), before the transmission of the next available UL NAS TRANSPORT message in the second queue, the UE (100) determines whether the first queue comprises at least one NAS Signalling message. On determining that the first queue does not comprise the at least one NAS Signalling message, at step 13 the UE (100) transmits the UL NAS TRANSPORT message carrying "User Data 2" from the second queue. The control plane user data "User Data 3" is the next available control plane user data in the second queue as described at step 14.

FIG. 7A is a Signalling diagram illustrating the failure in the transmission of the NAS Signalling message due to a large amount of CIoT user data being transmitted by the UE (100) in the 4G communication network, according to the prior art.

Referring to the FIG. 7A, at step 1, consider a large amount of the CIoT user data (for example 500 MB) transmission is triggered by the UE (100). At step 2, the plurality of ESM DATA TRANSPORT messages is triggered to send the pending ESM DATA TRANSPORT messages of the plurality of ESM DATA TRANSPORT messages (as shown in steps 2a-2n). Further, the amount of time taken to complete the transmission of the plurality of ESM DATA TRANSPORT messages increases if at least one of the serving PLMN data control and the 3GPP enhanced coverage feature is enabled by the wireless communication network.

At step 3, the NAS Signalling is triggered for example TAU request due to the UE capability update by the UE (100) and simultaneously T3430 (15 s+240 s) timer is also activated (step 4). Further, at step 5, the NAS Signalling message is not sent until the complete transmission of the plurality of ESM DATA TRANSPORT messages to the wireless communication network and at step 6, the T3430 timer expires. At step 7, the TAU fails if the transmission of the plurality of ESM DATA TRANSPORT messages is not completed within the expiry of the T3430 timer.

Figure 7B:
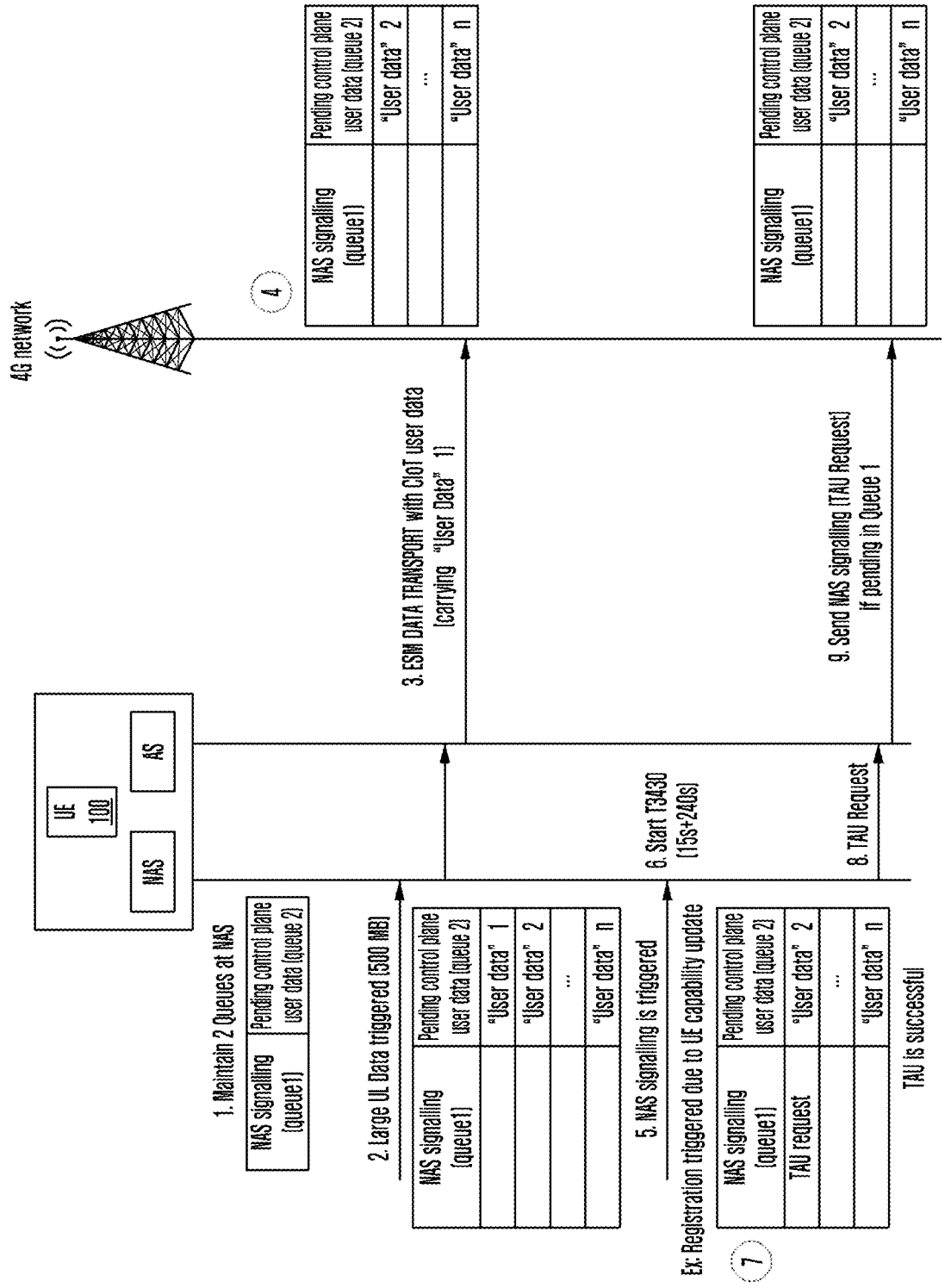
FIG. 7Ba is a Signalling diagram illustrating the prioritization of the NAS Signalling message over the CIoT user data by the UE (100) in the 4G communication network, according to the embodiments as disclosed herein.
Figure 7B:
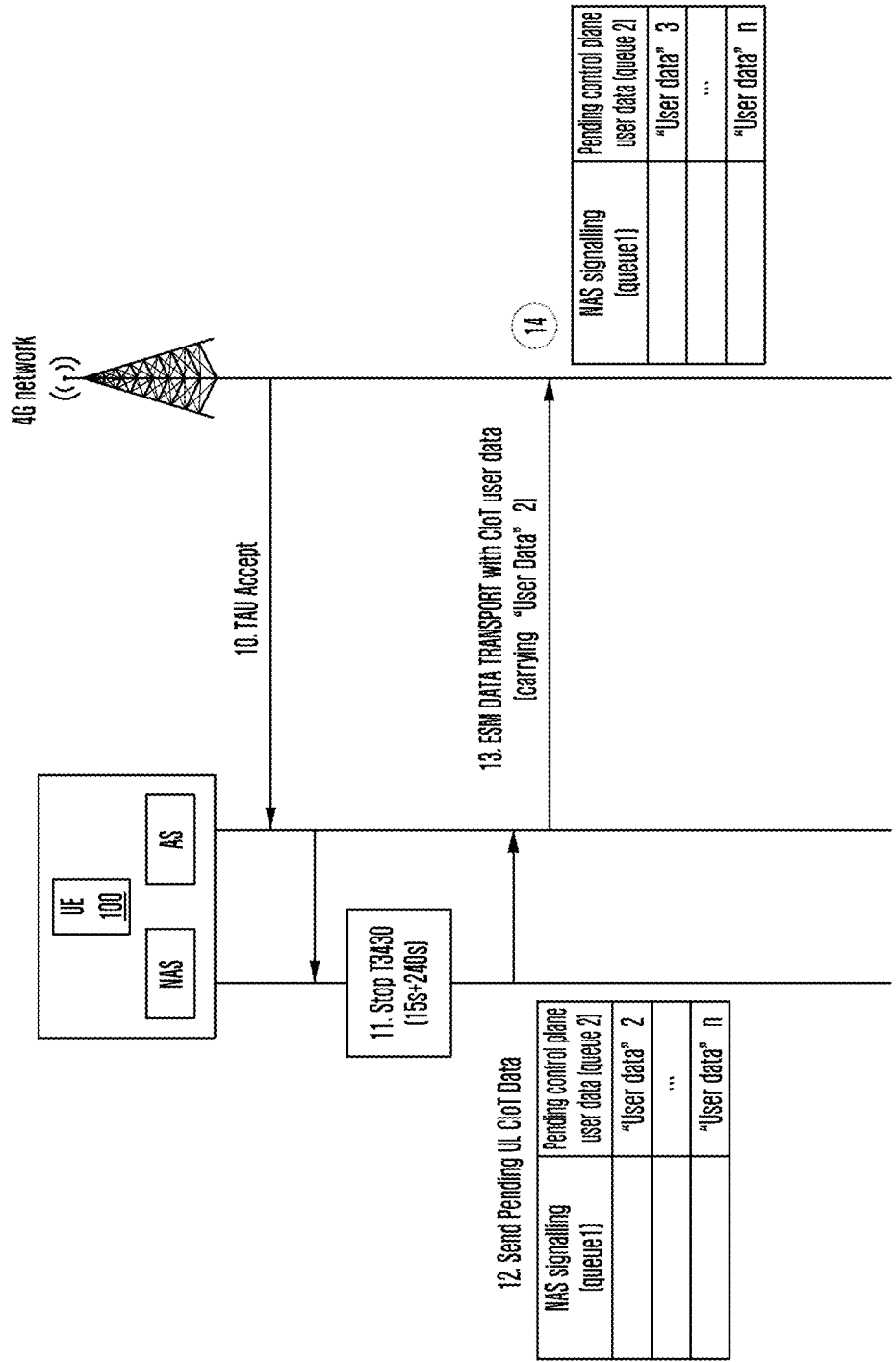

FIG. 7Ba and FIG. 7Bb are Signalling diagrams illustrating the prioritization of the NAS Signalling message over the CIoT user data by the UE (100) in the 4G communication network, according to the embodiments as disclosed herein.

Referring to the FIG. 7Ba, at step 1, the UE (100) generates two queues at the NAS layer between the UE (100) and the 4G communication network. The first queue is generated to hold the pending NAS Signalling messages and the second queue is generated to hold the pending control plane user data.

At step 2, the UE (100) triggers the transmission of the large amount of the CIoT user data for example 500 MB of CIoT user data. The UE (100) determines whether the first queue comprises at least one NAS Signalling message before transmission of the CIoT user data. On determining that the first queue does not comprise at least one NAS Signalling message, at step 3, the UE (100) transmits the ESM DATA TRANSPORT message carrying "User Data 1" pending in the second queue. The control plane user data "User Data 2" is the next available control plane user data in the second queue as described at step 4.

At step 5, the UE (100) determines that the NAS Signalling is triggered for example for performing the TAU due to the UE capability update and at step 6, the UE (100) activates the T3430 (15 s+240 s) timer. Further, at step 7, before transmission of the next available ESM DATA TRANSPORT message in the second queue, the UE (100) determines whether the first queue comprises at least one NAS Signalling message. On determining that the first queue comprises at least one NAS Signalling message i.e., the TAU request message for performing the TAU due to the UE capability update, at step 8 the UE (100) prioritizes the first queue over the second queue and initiates the TAU update procedure by transmitting the NAS Signalling message (i.e., the TAU request message) from the first queue to the 4G communication network (step 9).

Referring to the FIG. 7Bb, at step 10, the UE (100) receives a TAU accept message from the 4G communication network on the successful completion of the TAU procedure. Further, the TAU accept message is received by the UE (100) before the expiry of the T3430 (15 s+240 s) timer (step 11).

At step 12, the UE (100), before the transmission of the next available ESM DATA TRANSPORT message in the second queue, the UE (100) determines whether the first queue comprises at least one NAS Signalling message pending to be transmitted to the 4G communication network. On determining that the first queue does not comprise the at least one NAS Signalling message, at step 13 the UE (100) transmits the ESM DATA TRANSPORT message carrying "User Data 2" from the second queue. The control plane user data "User Data 3" is the next available control plane user data in the second queue as described at step 14.

Therefore, unlike to the conventional methods and systems, in the proposed method the UE (100) before sending each of the ESM DATA TRANSPORT messages checks whether the NAS Signalling message is pending and sends the NAS Signalling message first in case the NAS Signalling message is pending. Thereby avoiding a substantial delay in the transmission of the NAS Signalling messages.

The embodiments disclosed herein can be implemented through at least one software program running on at least one hardware device and performing network management functions to control the elements. The elements shown in the FIGS. 1 to 7B include blocks, elements, actions, acts, steps, or the like which can be at least one of a hardware device, or a combination of hardware device and software module.

The foregoing description of the specific embodiments will so fully reveal the general nature of the embodiments herein that others can, by applying current knowledge, readily modify and or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method performed by a user equipment (UE) in a wireless communication system, the method comprising:
transmitting, to an access and mobility management function (AMF), a registration request message for mobility or periodic registration update; and
receiving, from the AMF, a de-registration request message for a de-registration procedure, before a registration procedure based on the registration request message for the mobility or the periodic registration update has been completed,
wherein, in case that a specific cause value is included in the de-registration request message, the registration procedure for the mobility or the periodic registration update is progressed and the de-registration procedure is aborted, and
wherein the specific cause value is at least one of a $5^{th}$ generation system mobility management (5GMM) cause value #11, #12, #13 or #15.

2. The method of claim 1, wherein, in case that the specific cause value is not included in the de-registration request message, the registration procedure for the mobility or the periodic registration update is aborted and the de-registration procedure is progressed.

3. The method of claim 1,
wherein the 5GMM cause value
11 corresponds to information associated with a public land mobile network (PLMN) not allowed,
wherein the 5GMM cause value #12 corresponds to information associated with a tracking area not allowed,
wherein the 5GMM cause value #13 corresponds to information associated with a roaming not allowed in a tracking area, and
wherein the 5GMM cause value #15 corresponds to information associated with no suitable cells in a tracking area.

4. A method performed by an access and mobility management function (AMF) in a wireless communication system, the method comprising:
transmitting, to a user equipment (UE), a de-registration request message for a de-registration procedure; and
receiving, from the UE, a registration request message for mobility or periodic registration update before the de-registration procedure based on the de-registration request message has been completed,
wherein, in case that a specific cause value is included in the de-registration request message, the de-registration procedure is aborted and a registration procedure for the mobility or the periodic registration update is progressed, and
wherein the specific cause value is at least one of a $5^{th}$ generation system mobility management (5GMM) cause value #11, #12, #13 or #15.

5. The method of claim 4, wherein, in case that the specific cause value is not included in the de-registration request message, the registration procedure for the mobility or the periodic registration update is aborted and the de-registration procedure is progressed.

6. The method of claim 4,
wherein the 5GMM cause value #11 corresponds to information associated with a public land mobile network (PLMN) not allowed,
wherein the 5GMM cause value #12 corresponds to information associated with a tracking area not allowed,
wherein the 5GMM cause value #13 corresponds to information associated with a roaming not allowed in a tracking area, and
wherein the 5GMM cause value #15 corresponds to information associated with no suitable cells in a tracking area.

7. A user equipment (UE) in a communication system, the UE comprising:
a transceiver; and
a processor configured to:
 transmit, to an access and mobility management function (AMF), a registration request message for mobility or periodic registration update, and
 receive, from the AMF, a de-registration request message for a de-registration procedure before a registration procedure based on the registration request message for the mobility or the periodic registration update has been completed,
wherein, in case that a specific cause value is included in the de-registration request message, the registration procedure for the mobility or the periodic registration update is progressed and the de-registration procedure is aborted, and
wherein the specific cause value is at least one of a $5^{th}$ generation system mobility management (5GMM) cause value #11, #12, #13 or #15.

8. The UE of claim 7, wherein, in case that the specific cause value is not included in the de-registration request message, the registration procedure for the mobility or the periodic registration update is aborted and the de-registration procedure is progressed.

9. The UE of claim 7,
wherein the 5GMM cause value #11 corresponds to information associated with a public land mobile network (PLMN) not allowed,
wherein the 5GMM cause value #12 corresponds to information associated with a tracking area not allowed,
wherein the 5GMM cause value #13 corresponds to information associated with a roaming not allowed in a tracking area, and
wherein the 5GMM cause value #15 corresponds to information associated with no suitable cells in a tracking area.

10. An access and mobility management function (AMF) in a wireless communication system, the AMF comprising:
a transceiver; and
a processor configured to:
 transmit, to a user equipment (UE), a de-registration request message for a de-registration procedure, and
 receive, from the UE, a registration request message for mobility or periodic registration update before the de-registration procedure based on the de-registration request message has been completed,
wherein, in case that a specific cause value is included in the de-registration request message, the de-registration procedure is aborted and a registration procedure for the mobility or the periodic registration update is progressed, and
wherein the specific cause value is at least one of a $5^{th}$ generation system mobility management (5GMM) cause value #11, #12, #13 or #15.

11. The AMF of claim 10, wherein, in case that the specific cause value is not included in the de-registration request message, the registration procedure for the mobility or the periodic registration update is aborted and the de-registration procedure is progressed.

12. The AMF of claim 10,
wherein the 5GMM cause value #11 corresponds to information associated with a public land mobile network (PLMN) not allowed,
wherein the 5GMM cause value #12 corresponds to information associated with a tracking area not allowed,
wherein the 5GMM cause value #13 corresponds to information associated with a roaming not allowed in a tracking area, and
wherein the 5GMM cause value #15 corresponds to information associated with no suitable cells in a tracking area.

* * * * *